(12) United States Patent
Kim et al.

(10) Patent No.: US 10,904,504 B2
(45) Date of Patent: Jan. 26, 2021

(54) ELECTRONIC APPARATUS AND CONTROL METHOD THEREOF

(71) Applicant: SAMSUNG ELECTRONICS CO., LTD., Suwon-si (KR)

(72) Inventors: Bongjoe Kim, Suwon-si (KR); Jongho Kim, Suwon-si (KR); Gimun Eom, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/526,288

(22) Filed: Jul. 30, 2019

(65) Prior Publication Data
US 2020/0077068 A1    Mar. 5, 2020

(30) Foreign Application Priority Data
Aug. 30, 2018 (KR) .......................... 10-2018-0102895

(51) Int. Cl.
*H04N 9/74* (2006.01)
*H04N 5/235* (2006.01)
(Continued)

(52) U.S. Cl.
CPC ............. *H04N 9/74* (2013.01); *H04N 5/2352* (2013.01); *H04N 5/23229* (2013.01); *H04N 5/272* (2013.01)

(58) Field of Classification Search
CPC ................................. H04N 9/74; H04N 5/2352
See application file for complete search history.

(56) References Cited

U.S. PATENT DOCUMENTS

| 5,532,754 A | 7/1996 | Young et al. |
| 5,784,498 A | 7/1998 | Venable |

(Continued)

FOREIGN PATENT DOCUMENTS

| CN | 104639748 A | 5/2015 |
| EP | 0 772 157 A1 | 5/1997 |

(Continued)

OTHER PUBLICATIONS

Communication dated Jan. 22, 2020, issued by the European Patent Office in counterpart European Application No. 17191786.7.

(Continued)

*Primary Examiner* — Christopher K Peterson
(74) *Attorney, Agent, or Firm* — Sughrue Mion, PLLC

(57) ABSTRACT

An electronic apparatus is disclosed. The electronic apparatus includes a communicator, a camera, a memory storing a reference image including a plurality of gradation regions that have different gradation values, and a processor to photograph the display device that outputs the reference image and a background of the display device, through the camera, obtain correction data for correcting a gradation value of the photographed image based on a plurality of gradation regions included in the photographed image and a plurality of gradation regions included in the stored reference image, correct a background image corresponding to the background from the photographed image based on the obtained correction data, and control the communicator to output the corrected background image on the display device.

20 Claims, 19 Drawing Sheets

(51) Int. Cl.
*H04N 5/232* (2006.01)
*H04N 5/272* (2006.01)

(56) References Cited

U.S. PATENT DOCUMENTS

| | | |
|---|---|---|
| 6,529,280 B1 | 3/2003 | Yahashi et al. |
| 8,437,567 B2 | 5/2013 | Jeong et al. |
| 9,076,221 B2 | 7/2015 | Xiong et al. |
| 9,201,467 B2 | 12/2015 | Fujii et al. |
| 9,390,646 B2 | 7/2016 | Park et al. |
| 9,392,177 B2 | 7/2016 | Takasumi et al. |
| 9,857,867 B2 | 1/2018 | Kumar et al. |
| 9,965,999 B1 | 5/2018 | Barnes |
| 10,122,969 B1 | 11/2018 | Lim et al. |
| 2003/0160884 A1 | 8/2003 | Hanson |
| 2006/0007511 A1 | 6/2006 | Koyama et al. |
| 2008/0002216 A1 | 1/2008 | Matsushima |
| 2010/0066712 A1 | 3/2010 | Tomonaga |
| 2010/0079426 A1 | 4/2010 | Pance et al. |
| 2011/0149181 A1 | 6/2011 | Kim et al. |
| 2012/0013646 A1 | 1/2012 | Ichioka et al. |
| 2012/0038663 A1 | 2/2012 | Gustafsson et al. |
| 2012/0120103 A1 | 5/2012 | Border et al. |
| 2012/0133790 A1 | 5/2012 | Sams |
| 2012/0188243 A1 | 7/2012 | Fujii et al. |
| 2013/0265306 A1 | 10/2013 | Landweber |
| 2014/0063052 A1 | 3/2014 | Choi |
| 2014/0139883 A1* | 5/2014 | Hashizume ........ H04N 1/00031 358/3.06 |
| 2014/0152706 A1 | 6/2014 | Park et al. |
| 2014/0204023 A1 | 7/2014 | Kumar et al. |
| 2014/0232625 A1 | 8/2014 | Murase et al. |
| 2014/0282159 A1 | 9/2014 | Lee et al. |
| 2014/0306980 A1 | 10/2014 | Won et al. |
| 2014/0356912 A1 | 12/2014 | Boddy et al. |
| 2014/0365912 A1 | 12/2014 | Shaw et al. |
| 2014/0365919 A1 | 12/2014 | Shaw et al. |
| 2015/0145887 A1 | 5/2015 | Forutanpour et al. |
| 2015/0260505 A1 | 9/2015 | Nagano et al. |
| 2016/0011737 A1 | 1/2016 | Kang et al. |
| 2016/0035138 A1 | 2/2016 | Kim et al. |
| 2016/0041721 A1 | 2/2016 | Fujii et al. |
| 2016/0097935 A1 | 4/2016 | Chien et al. |
| 2016/0117972 A1 | 4/2016 | Yoshiyama et al. |
| 2016/0180558 A1 | 6/2016 | Kim |
| 2017/0357397 A1 | 12/2017 | Masumoto |
| 2018/0101222 A1 | 4/2018 | Kumar et al. |
| 2018/0103299 A1 | 4/2018 | Kim et al. |
| 2018/0164981 A1 | 6/2018 | Park et al. |
| 2018/0165052 A1* | 6/2018 | Kim .................. G09G 5/14 |
| 2018/0174555 A1 | 6/2018 | Lee et al. |
| 2018/0247613 A1 | 8/2018 | Lee et al. |
| 2018/0300770 A1 | 10/2018 | Kamel et al. |
| 2018/0330697 A1 | 11/2018 | Lee et al. |
| 2018/0342224 A1 | 11/2018 | Beon et al. |
| 2019/0011691 A1 | 1/2019 | Pey man |

FOREIGN PATENT DOCUMENTS

| | | |
|---|---|---|
| EP | 2 128 686 A1 | 12/2009 |
| EP | 2 129 084 A1 | 12/2009 |
| EP | 3 319 076 A1 | 5/2018 |
| JP | 2005-258162 A | 9/2005 |
| JP | 2006-189708 A | 7/2006 |
| JP | 2006-333301 A | 12/2006 |
| JP | 2007-201580 A | 8/2007 |
| JP | 2007-324974 A | 12/2007 |
| JP | 2008-180797 A | 8/2008 |
| JP | 2009-21771 A | 1/2009 |
| JP | 2010-72141 A | 4/2010 |
| JP | 2011-48198 A | 3/2011 |
| JP | 2011-180964 A | 9/2011 |
| JP | 2012-155556 A | 8/2012 |
| JP | 2013-168922 A | 8/2013 |
| JP | 2014-114071 A | 6/2014 |
| JP | 2016-49998 A | 4/2016 |
| KR | 20-2000-0000145 U | 1/2000 |
| KR | 20-2000-0009068 U | 5/2000 |
| KR | 10-2009-0075234 A | 7/2009 |
| KR | 10-2012-0063987 A | 6/2012 |
| KR | 10-2013-0006878 A | 1/2013 |
| KR | 10-1222318 B1 | 1/2013 |
| KR | 10-2014-0028558 A | 3/2014 |
| KR | 10-2014-0060365 A | 5/2014 |
| KR | 10-2014-0070120 A | 6/2014 |
| KR | 10-2014-0094393 A | 7/2014 |
| KR | 10-1495165 B1 | 2/2015 |
| KR | 10-2015-0044787 A | 4/2015 |
| KR | 10-2015-0054059 A | 5/2015 |
| KR | 10-2016-0002461 A | 1/2016 |
| KR | 10-2016-0047972 A | 5/2016 |
| KR | 10-2016-0074288 A | 6/2016 |
| KR | 10-2018-0039394 A | 4/2018 |
| KR | 10-2018-0072337 A | 6/2018 |
| KR | 10-2018-0074405 A | 7/2018 |
| WO | 2010/024000 A1 | 3/2010 |
| WO | 2015/056932 A1 | 4/2015 |
| WO | 2015/077591 A1 | 5/2015 |
| WO | 2016/124146 A1 | 8/2016 |
| WO | 2017052102 A1 | 3/2017 |

OTHER PUBLICATIONS

Communication dated Feb. 4, 2020, issued by the European Patent Office in counterpart European Application No. 19186608.6.
Communication dated Oct. 11, 2019, issued by the United States Patent and Trademark Office in counterpart U.S. Appl. No. 15/840,274.
Communication dated Oct. 21, 2019, issued by the United States Patent and Trademark Office in counterpart U.S. Appl. No. 15/704,180.
Search Report dated Nov. 19, 2019, issued by the International Searching Authority in International Application No. PCT/KR2019/009316 (PCT/ISA/210).
Written Opinion dated Nov. 19, 2019, issued by the International Searching Authority in International Application No. PCT/KR2019/009316 (PCT/ISA/237).
Office Action dated Jun. 13, 2019 by the Korean Intellectual Property Office in counterpart Korean Patent Application No. 10-2016-0130645.
International Search Report (PCT/ISA/210) dated Dec. 27, 2017 by the International Searching Authority in counterpart International Application No. PCT/KR2017/009962.
Written Opinion (PCT/ISA/237) dated Dec. 27, 2017 by the International Searching Authority in counterpart International Application No. PCT/KR2017/009962.
International Search Report (PCT/ISA/210) dated Mar. 22, 2018 by the International Searching Authority in counterpart International Application No. PCT/KR2017/014634.
Written Opinion (PCT/ISA/237) dated Mar. 22, 2018 by the International Searching Authority in counterpart International Application No. PCT/KR2017/014634.
Search Report dated Feb. 22, 2018 by the European Patent Office in counterpart European Patent Application No. 17191786.7.
Office Action dated Jan. 28, 2019 by the Korean Intellectual Property Office in counterpart Korean Patent Application No. 10-2016-0130645.
Office Action dated Feb. 8, 2019 by the European Patent Office in counterpart European patent Application No. 17191786.7.
Office Action dated Jul. 27, 2018 by the United States Patent and Trademark Office in counterpart U.S. Appl. No. 15/840, 274.
Office Action dated Jan. 10, 2019 by the United States Patent and Trademark Office in counterpart U.S. Appl. No. 15/840,274.
Office Action dated May 22, 2019 by the United States Patent and Trademark Office in counterpart U.S. Appl. No. 15/840,274.
Office Action dated Jan. 14, 2019 by the United States Patent and Trademark Office in counterpart U.S. Appl. No. 15/704,180.
Office Action dated Jun. 26, 2019 by the United States Patent and Trademark Office in counterpart U.S. Appl. No. 15/704,180.
Search Report dated Jul. 22, 2019 by the European Patent Office in counterpart European patent Application No. 17881422.4.

(56) References Cited

OTHER PUBLICATIONS

Notice of Allowance dated Jul. 22, 2019 by the Korean Intellectual Property Office in counterpart Korean patent Application No. 10-2016-0130645.
Communication dated Jun. 30, 2020, from the Japanese Patent Office in Application No. 2019-526317.

* cited by examiner

10

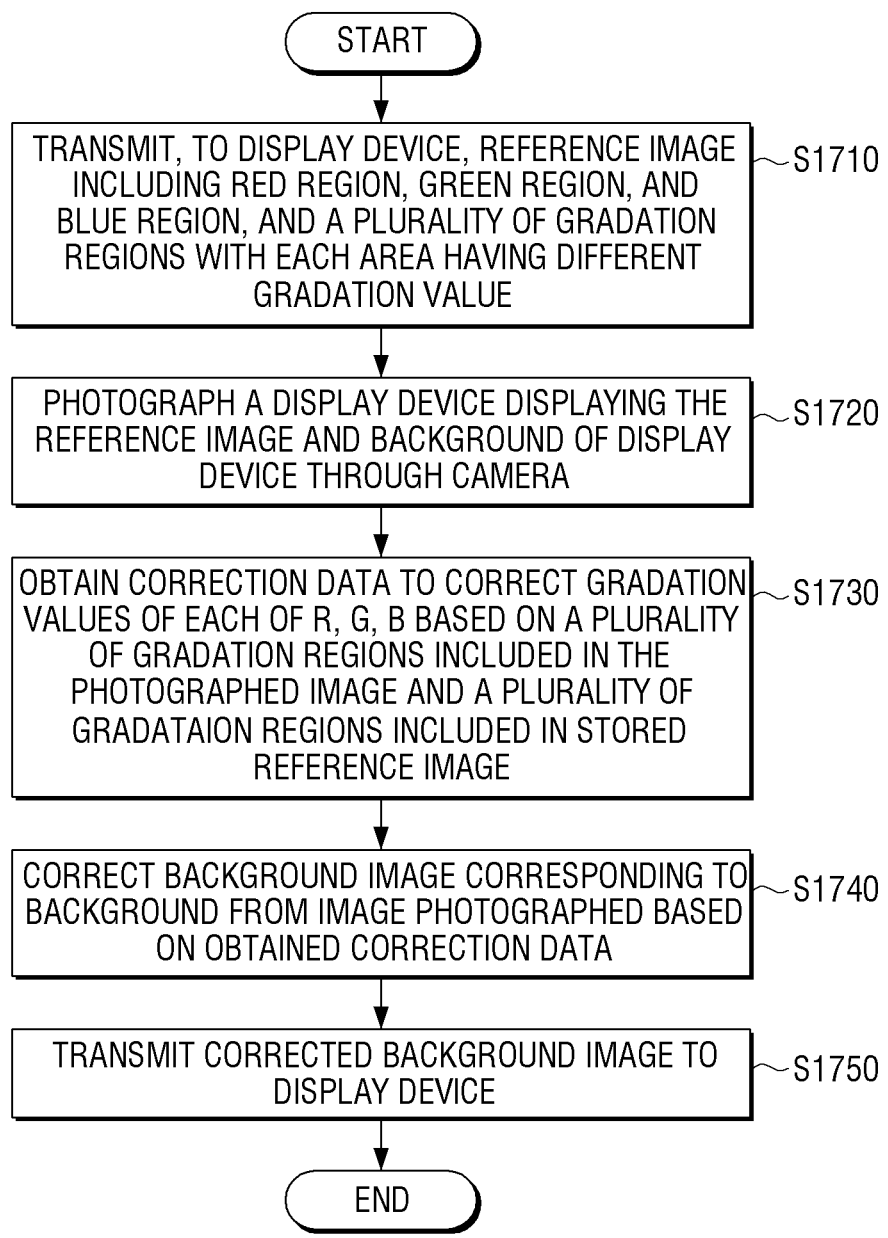

ELECTRONIC APPARATUS AND CONTROL METHOD THEREOF

CROSS-REFERENCE TO RELATED APPLICATIONS

This application claims is based on and claims priority under 35 U.S.C. § 119 to Korean Patent Application No. 10-2018-0102895, filed on Aug. 30, 2018, in the Korean Intellectual Property Office, the disclosure of which is incorporated herein by reference in its entirety.

BACKGROUND

Field

The disclosure relates to an electronic apparatus and a control method thereof and, more particularly, to a display apparatus which provides a background image to a display device and a control method thereof.

Description of the Related Art

Recent developments in electronic technology have led to development of an electronic apparatus providing various user experiences. In particular, as shown in FIG. 1, a display apparatus for displaying a background image obtained by photographing an ambient region of a display device has been developed. The display device may provide a user with a visual effect as if the user sees a transparent glass window.

In order to provide the visual effect, in the related art, an ambient region of the display device is photographed using a camera such as a smartphone, and then a background image obtained from the photographed image is displayed on the display device.

However, a gradation value of the background image obtained through a camera such as a smartphone may be different from the gradation value of an actual background according to color temperature, tone, or the like, set in the smartphone. Therefore, when a background image obtained by using a camera such as a smartphone is displayed as it is on a display device as is in the related art, there is a problem in that a color difference between the real background (i.e., the region surrounding the display device) and the background image displayed on the display device occurs, and the image may be seen in a unnatural manner.

SUMMARY

Embodiments may overcome the above disadvantages and other disadvantages not described above. Also, an embodiment is not required to overcome the disadvantages described above, and an embodiment may not overcome any of the problems described above.

The disclosure is purposed to minimize a color difference between the real background and a background image displayed on a display device, thereby providing a maximized visual effect that the display device looks like a transparent glass window to a user.

According to an aspect of the disclosure, there is provided an electronic apparatus comprising: a memory storing a reference image comprising a plurality of gradation regions having different gradation values; a camera configured to photograph a display device that outputs the reference image and an area surrounding the display device; and a processor configured to: obtain correction data for correcting a gradation value of the photographed image based on a plurality of gradation regions included in the photographed image and the plurality of gradation regions included in the stored reference image, generate a background image corresponding to the area surrounding the display device from the photographed image based on the obtained correction data, and control the display device to output the background image.

The processor may be further configured to correct a gradation value of R, G, and B sub-pixels of each of at least one pixel included in the background image based on the obtained correction data.

The processor may be configured to: obtain the correction data corresponding to the R, G, and B sub-pixels included in each of the at least one pixel of the background image, and correct the gradation value of the R, G, and B sub-pixels of each of the at least one pixel based on the obtained correction data.

The processor may be further configured to obtain the correction data for correcting a gradation value of each of R, G, and B components based on gradation levels, by comparing the gradation value of the plurality of gradation regions included in the photographed image and the gradation value of the plurality of gradation regions included in the stored reference image.

The reference image may be composed of a red region, a green region, and a blue region, and the plurality of gradation regions may comprise a plurality of red gradation regions corresponding to the red region having different gradation values, a plurality of green gradation regions having different gradation values corresponding to the green region, and a plurality of blue gradation regions having different gradation values corresponding to the blue region, wherein the processor may be further configured to: obtain correction data to correct a gradation value of the R component based on the gradation levels, by comparing a gradation value of each gradation region of a red region included in the photographed image and a gradation value of each of the plurality of red gradation regions included in the stored reference image, obtain correction data to correct a gradation value of the G component based on gradation levels, by comparing a gradation value of each gradation region of a green region included in the photographed image and a gradation value of each of the plurality of green gradation regions included in the stored reference image, and obtain correction data to correct a gradation value of the B by gradation levels, by comparing a gradation value of each gradation region of a blue region included in the photographed image and a gradation value of each of the plurality of blue gradation regions included in the stored reference image.

The processor may be further configured to: correct R sub-pixels of each of at least one pixels included in the background image based on obtained correction data for the R component, correct G sub-pixels of each of at least one pixels included in the background image based on obtained correction data for the G component, and correct B sub-pixels of each of at least one pixels included in the background image based on obtained correction data for the B component.

Gradation values of the R component in the plurality of red gradation regions may be different in a stepwise manner, and gradation values of G and B components in the plurality of red gradation regions may be equal to each other.

Gradation values of the G component in the plurality of green gradation regions may be different in a stepwise manner, and gradation values of R and B components in the plurality of green regions may be equal to each other.

Gradation values of the B component in the plurality of blue gradation regions may be different in a stepwise manner, and gradation values of R and G components in the plurality of blue regions may be equal to each other.

The processor may be further configured to: based on a determination that illumination in the area surrounding the display device is less than a first predetermined threshold illumination, generate the reference image by dividing only a gradation range which is less than a first predetermined gradation value into a predetermined gradation unit, and based on a determination that the illumination in the area surrounding the display device is greater than or equal to a second predetermined threshold illumination, generate the reference image by dividing only a gradation range which is greater than or equal to a second predetermined gradation value into the predetermined gradation unit.

The processor may be further configured to generate the reference image so that a difference of gradation values among a plurality of gradation regions included in a region corresponding to a color which is included in the background image by a predetermined ratio or more, from among a red region, a green region, and a blue region, is smaller than a difference of gradation values among a plurality of gradation regions included in another region, based on a color included in the background image.

The processor may be configured to: based on determination that a red color being included in the background image by a predetermined threshold ratio or more, generate the reference image so that a difference of a gradation value of the R component among the plurality of red gradation regions is smaller than a difference of a gradation value of the G component among the plurality of green gradation regions and a difference of a gradation value of the B component among the plurality of blue gradation regions, based on determination that a green color being included in the background image by a predetermined threshold ratio or more, generate the reference image so that a difference of a gradation value of the G component among the plurality of green gradation regions is smaller than a difference of a gradation value of the R component among the plurality of red gradation regions and a difference of a gradation value of the B component among the plurality of blue gradation regions, and based on a determination that a blue color being included in the background image by a predetermined threshold ratio or more, generate the reference image so that a difference of a gradation value of the B component among the plurality of blue gradation regions is smaller than a difference of a gradation value of the G component among the plurality of green gradation regions and a difference of a gradation value of the R component among the plurality of red gradation regions.

According to an aspect of the present disclosure, there is provided a control method of an electronic apparatus, the method comprising: transmitting, to a display device, a prestored reference image comprising a plurality of gradation region having different gradation values; photographing the display device that outputs the reference image and an area surrounding the display device; obtaining correction data for correcting a gradation value of the photographed image based on a plurality of gradation regions included in the photographed image and the plurality of gradation regions included in the stored reference image; generating a background image corresponding to the area surrounding the display device from the photographed image based on the obtained correction data; and transmitting the background image to output the background image on the display device.

The generating the background image may comprise correcting a gradation value of R, G, and B sub-pixels of each of at least one pixel included in the background image based on the obtained correction data.

The generating the background image may comprise obtaining the correction data corresponding to R, G, and B sub-pixels included in each of the at least one pixel of the background image, and correcting the gradation value of the R, G, and B sub-pixels of each of the at least one pixel based on the obtained correction data.

The obtaining the correction data may comprise obtaining correction data for correcting a gradation value of each of R, G, and B complements based on gradation levels, by comparing the gradation value of the plurality of gradation regions included in the photographed image and the gradation value of the plurality of gradation regions included in the stored reference image.

The reference image may be composed of a red region, a green region, and a blue region, and the plurality of gradation regions comprises a plurality of red gradation regions corresponding to the red region having different gradation values, a plurality of green gradation regions having different gradation values corresponding to the green region, and a plurality of blue gradation regions having different gradation values corresponding to the blue region, and wherein the obtaining the correction data may comprise: obtaining correction data to correct a gradation value of the R component based on the gradation levels, by comparing a gradation value of each gradation region of a red region included in the photographed image and a gradation value of each of the plurality of red gradation regions included in the stored reference image, obtaining correction data to correct a gradation value of the G component based on the gradation levels, by comparing a gradation value of each gradation region of a green region included in the photographed image and a gradation value of each of the plurality of green gradation regions included in the stored reference image, and obtaining correction data to correct a gradation value of the B component based on the gradation levels, by comparing a gradation value of each gradation region of a blue region included in the photographed image and a gradation value of each of the plurality of blue gradation regions included in the stored reference image.

The correcting may comprise: correcting R sub-pixels of each of at least one pixels included in the background image based on obtained correction data for the R component, correcting G sub-pixels of each of at least one pixels included in the background image based on obtained correction data for the G component, and correcting B sub-pixels of each of at least one pixels included in the background image based on obtained correction data for the B component.

Gradation values of the R component in the plurality of red gradation regions may be different in a stepwise manner, and gradation values of G and B components in the plurality of red gradation regions may be equal to each other.

Gradation values of the G component in the plurality of green gradation regions may be different in a stepwise manner, and gradation values of R and B components in the plurality of green regions may be equal to each other.

Gradation values of the B component in the plurality of blue gradation regions may be different in a stepwise manner, and gradation values of R and G components in the plurality of blue regions may be equal to each other.

The method may further comprise, based on a determination that illumination in the area surrounding the display device is less than a first predetermined threshold illumination, on a basis of illumination around the display device, generating the reference image by dividing only a gradation range which is less than a first predetermined gradation value, and based on a determination that illumination in the area surrounding the display device being greater than or equal to a second predetermined threshold illumination, generating reference image by dividing only a gradation range which is greater than or equal to a second predetermined gradation value.

The method may further comprises generating the reference image so that a difference of gradation values among a plurality of gradation regions included in a region corresponding to a color which is included in the background image by a predetermined ratio or more, from among a red region, a green region, and a blue region, is smaller than a difference of gradation values among a plurality of gradation regions included in another region, based on a color included in the background image.

The generating the reference image may comprise: based on determination that a red color being included in the background image by a predetermined threshold ratio or more, generating the reference image so that a difference of a gradation value of the R component among the plurality of red gradation regions is smaller than a difference of a gradation value of the G component among the plurality of green gradation regions and a difference of a gradation value of the B component among the plurality of blue gradation regions, based on a determination that green color being included in the background image by a predetermined threshold ratio or more, generating the reference image so that a difference of a gradation value of the G component among the plurality of green gradation regions is smaller than a difference of a gradation value of the R component among the plurality of red gradation regions and a difference of a gradation value of the B component among the plurality of blue gradation regions, and based on a determination that blue color being included in the background image by a predetermined threshold ratio or more, generating the reference image so that a difference of a gradation value of the B component among the plurality of blue gradation regions is smaller than a difference of a gradation value of the G component among the plurality of green gradation regions and a difference of a gradation value of the R component among the plurality of red gradation regions.

According to another aspect of the disclosure, there is provided an electronic apparatus comprising: a memory storing a first image comprising a plurality of gradation regions having different gradation values; and a processor configured to: acquire a second image captured by a camera comprising a first portion and a second portion, the first portion corresponding to a display screen that outputs the first image and the second portion corresponding to an area surrounding the display screen; and obtain adjustment data for adjusting a gradation value in the first portion of the second image based on a difference between a plurality of gradation regions included in the first portion of the second image and the plurality of gradation regions included in the first image stored in the memory, and control the display screen to output a third image corresponding to the second portion of the second image based on the adjustment data.

The electronic apparatus may further comprise: the camera configured to capture the second image.

The electronic apparatus may further comprise: the display screen configured to output the third image.

The processor may be further configured to generate the third image by including at least a part of the second portion of the second image into the third image.

According to another aspect of the disclosure, there is provided a control method of an electronic apparatus comprising: receiving, from a storage, a first image comprising a plurality of gradation regions having different gradation values; receiving a second image captured by a camera comprising a first portion and a second portion, the first portion corresponding to a display screen that outputs the first image and the second portion corresponding to an area surrounding the display screen; obtaining adjustment data for adjusting a gradation value in the first portion of the second image based on a difference between a plurality of gradation regions included in the first portion of the second image and the plurality of gradation regions included in the first image stored in the memory, and controlling the display screen to output a third image corresponding to the second portion of the second image based on the adjustment data.

The method may further comprise generating the third image by including at least a part of the second portion of the second image into the third image.

BRIEF DESCRIPTION OF THE DRAWING FIGURES

The above and/or other aspects, features, and advantages of certain embodiments of the disclosure will be more apparent from the following description taken in conjunction with the accompanying drawings, in which:

FIG. 17 is a flowchart to describe a control method of an electronic apparatus according to an embodiment.

DETAILED DESCRIPTION OF THE EMBODIMENTS

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined on the basis of the meaning of the terms and the contents throughout the disclosure rather than simple names of the terms.

When it is decided that a detailed description for the known art related to the disclosure may unnecessarily obscure the gist of the disclosure, the detailed description will be shortened or omitted.

Embodiments of the disclosure will be described in detail with reference to the accompanying drawings, but the disclosure is not limited to embodiments described herein.

Hereinafter, the disclosure will be described with reference to the drawings.

Figure 2:
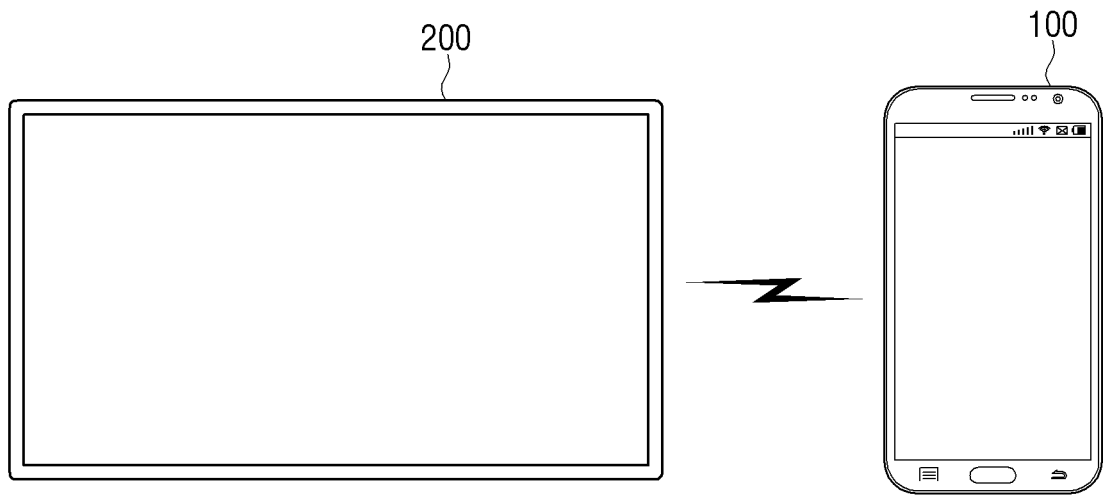
FIG. 2 is a view provided to describe an electronic system providing a background image according to an embodiment.

FIG. 2 is a view provided to describe an electronic system providing a background image according to an embodiment.

Referring to FIG. 2, an electronic system 10 according to an embodiment may include an electronic apparatus 100 and a display device 200.

As illustrated in FIG. 2, the electronic apparatus 100 may be a user terminal device such as a smartphone. This is merely exemplary, and the electronic apparatus 100 may be implemented as various electronic apparatuses including a camera, such as a camcorder, a tablet PC, or the like.

As illustrated in FIG. 2, the display apparatus 200 may be a smart TV. This is merely exemplary, and the display device 200 may be implemented as various electronic apparatuses including a display, such as a digital TV, a desk-top PC, a kiosk, or the like.

The electronic apparatus 100 and the display device 200 may perform communication and transceive various data.

In particular, the electronic apparatus 100 may transmit, to the display device 200, a background image related to an ambient background of the display device 200.

For this purpose, the electronic apparatus 100 may photograph a region where the display device 200 is installed to obtain an image including the display device 200 and the ambient region of the display device 200.

Figure 1:
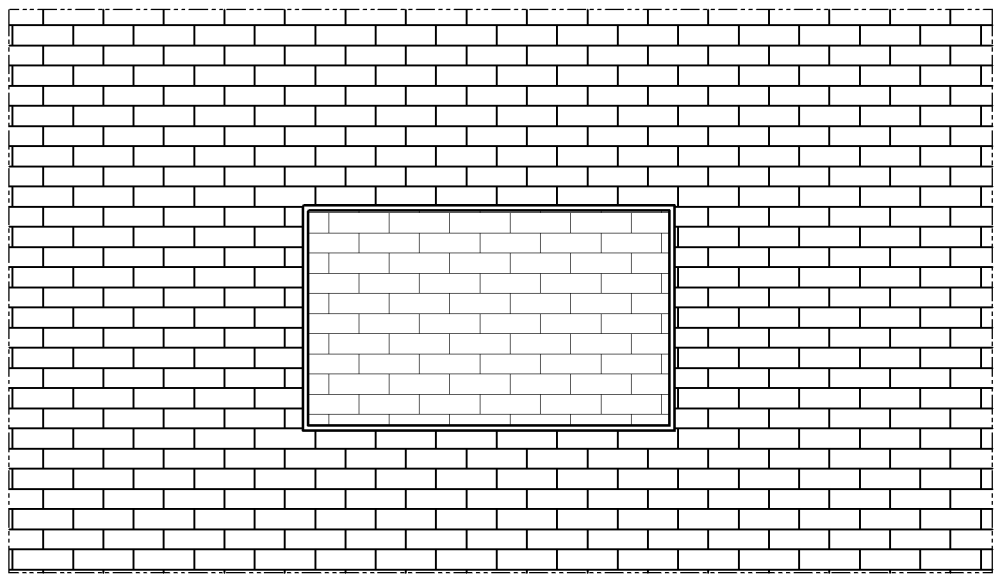
FIG. 1 is a view provided to describe a display device according to an embodiment.

For example, when the display device 200 is installed on a wall as illustrated in FIG. 1, the electronic apparatus 100 may photograph a region where the display device 200 is installed and obtain an image including the display device 200 and an ambient wall of the display device 200.

The electronic apparatus 100 may identify a region where the display device 200 is located and an ambient background region of the display device 200, and generate a background image using the identified background region. According to an embodiment, the electronic apparatus 100 may analyze an image including the ambient region surrounding the display device.

The electronic apparatus 100 may correct the gradation value of the background image so that the gradation value of the background image and the gradation value of the real background are minimized, and then transmit the corrected background image to the display device 200. According to an embodiment, the electronic apparatus 100 may adjust the gradation value of the background image. Here, the corrected background image means an image corrected so that the user may recognize the image as a single background without feeling any difference between the real background around the display device 200 and the background image which is being output from the display device 200. The details thereof will be described later.

Then, the display device 200 may display a corrected background image, and provide the user with a visual effect that a display device looks like a transparent glass window.

It has been described that the electronic apparatus 100 and the display device 200 directly communicate, but the disclosure is not limited thereto.

Specifically, the electronic apparatus 100 may perform communication with the display device 200 through an external device (not shown). Here, the external device (not shown) may be a set-top box, and may also be a variety of relay devices such as an access point (AP) and a router for relaying communication between the electronic apparatus 100 and the display device 200, or the like. The electronic apparatus 100 may communicate with an external device (not shown) to transmit a reference image to an external device, and the display device 200 may display the reference image received from the external device (not shown). In addition, the electronic apparatus 100 may transmit the corrected background image to the external device (not shown), and the display device 200 may display the corrected background image received from the external device (not shown).

Figure 3:
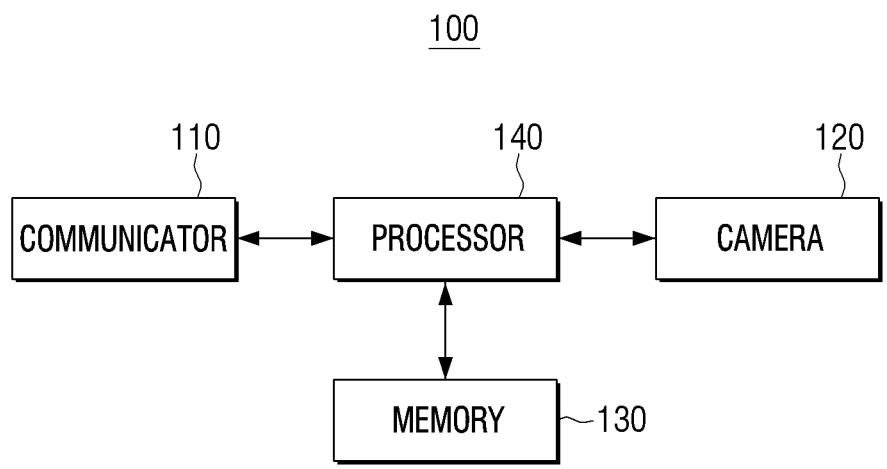
FIG. 3 is a block diagram provided to describe an electronic apparatus according to an embodiment.

FIG. 3 is a block diagram provided to describe an electronic apparatus according to an embodiment.

Referring to FIG. 3, the electronic apparatus 100 according to an embodiment may include a communicator 110, a camera 120, a memory 130, and a processor 140.

The communicator 110 may perform communication with the display device 200 and transceive various data.

In particular, the communicator 110 may transmit the reference image including a red region, a green region, and a blue region to the display device 200. The details of the reference image will be described later.

In addition, the communicator 110 may communicate with the display device 200 to transmit the corrected background image to the display device 200. Accordingly, the display device 200 may display a corrected background image and provide an effect like a window glass.

According to an embodiment, the communicator 110 may include a wireless communication chip, a Wi-Fi chip, a Bluetooth chip, or the like.

The camera 120 may photograph various objects. In particular, the camera 120 may photograph a region where the display device 200 is installed. Here, the display device 200 may be installed in a form of a frame in one region of the wall surface, or may be installed in the form of a stand in front of the wall surface. According to an embodiment, the camera may capture a still image. According to another embodiment, the camera may capture moving images.

When the display device 200 displays the reference image, the image photographed by the camera 120 may include the display device 200 that displays the reference image and an ambient region (that is, background) of the display device 200.

The memory 130 may store a program for controlling the electronic apparatus 100 and data. In particular, the memory 130 may store an image which includes the display device 200 and an ambient region of the display device 200 which are photographed by the camera 120.

In addition, the memory 130 may store the reference image including the red region, the green region, and the blue region. The details of the reference image will be described later.

The processor 140 controls overall operations of the electronic apparatus 100. For this purpose, the processor 140 may include one or more of a central processing unit (CPU), an application processor (CP), or a communication processor (CP).

The operations of the processor 140 will be further described with reference to FIGS. 4 to 10.

Figure 4:
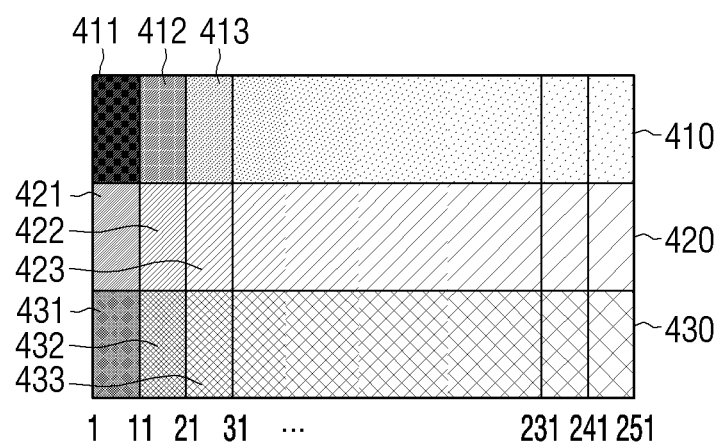
FIG. 4 is a view provided to describe a reference image according to an embodiment.

FIG. 4 is a view provided to describe a reference image according to an embodiment.

The electronic apparatus 100 according to an embodiment may store a reference image 400. The processor 140 may control the communicator 110 to transmit the prestored reference image 400 to the display device 200.

Referring to FIG. 4, the reference image 400 may include a red region 410, a green are 420, and a blue region 430. Here, each of the red region 410, the green region 420, and the blue region 430 may include a plurality of gradation regions (411, 412, 413, 421, 422, 423, 431, 432, 433 . . . ) having different gradation values.

Here, in the plurality of gradation regions included in the red region 410, the gradation values of R may be different in a stepwise manner by a predetermined value, and the gradation values of G and B may be equal to each other. In the plurality of gradation regions included in the green region 420, the gradation values of G may be different in a stepwise manner by a predetermined value, and the gradation values of R and B may be equal to each other. In the plurality of gradation regions included in the blue region 430, the gradation values of B may be different in a stepwise manner by a predetermined value, and the gradation values of R and G may be the same.

For example, in the first gradation region 411 of the red region 410, a gradation value of R may be 10, in the second gradation region 412, a gradation value of R may be 20, and in the third gradation region 413, a gradation value of R may be 30. Here, the gradation values of G and B may be the same to each other in each gradation region.

In the first gradation region 421 of the green region 420, the gradation value of G may be 10, in the second gradation region 422, the gradation value of the G may be 20, and in the third gradation region 423, the gradation value of G may be 30. Here, the gradation values of R and G may be the same in each gradation region.

In the first gradation region 431 of the blue region 430, the gradation value of B may be 10, in the second gradation region 432, the gradation value of B may be 20, and in the third gradation region 433, the gradation value of B may be 30. Here, the gradation values of R and B may be the same in each gradation.

In the meantime, each of the red region 410, the green region 420, and the blue region 430 may have a range of a gradation value from 1 to 251, and each gradation region may be divided in ten units. That is, the plurality of gradation regions included in the red region 410, the green region 420, and the blue region 430 may have a gradation value which increases by ten units in a stepwise manner.

In the meantime, the range of the gradation value from 1 to 251 is merely one embodiment, and the range of the gradation value is not limited thereto. In addition, it has been described that the gradation level of the gradation region gradually increases in units of ten, but the units may be variously set, such as four units, eight units, and the like.

In addition, the reference image which includes the red region 410, the green region 420, and the blue region 430 has been described, but this is merely exemplary, and the reference image may be various images representing a gradation value from a low value to a high value. For example, the reference image may be represented as a gray scale.

In addition, the reference image has been described as being prestored in the electronic apparatus 100, but the reference image may be an image received from an external server (not shown) or the display device 200. When the reference image is received from the display device 200, the operation of transmitting the reference image by the electronic apparatus 100 to the display device 200 may be omitted.

Figure 5:
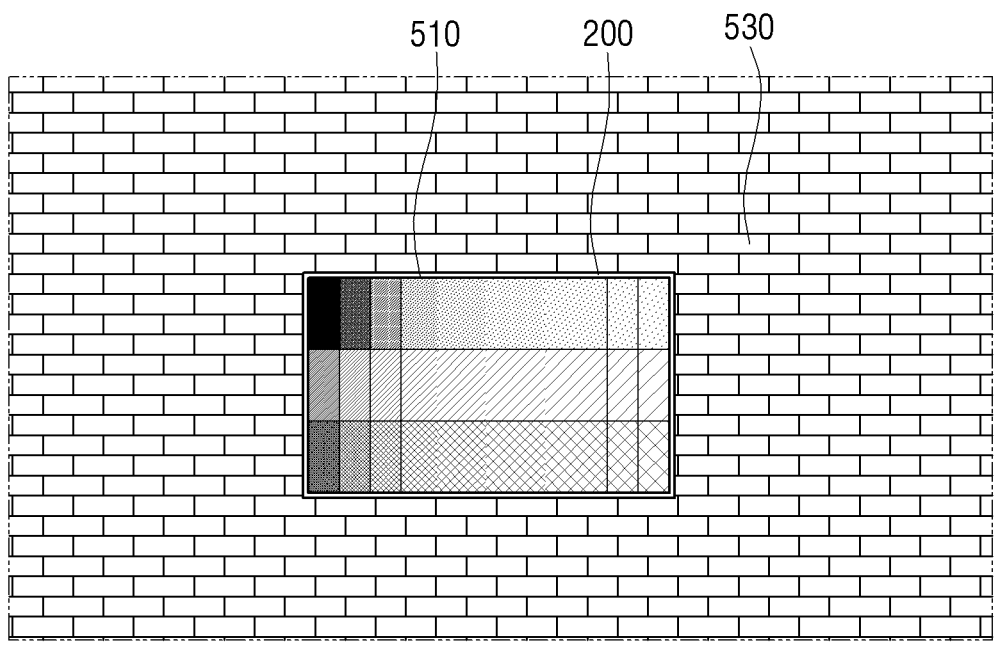
FIG. 5 is a view provided to describe an embodiment of photographing a reference image according to an embodiment.
Figure 5:
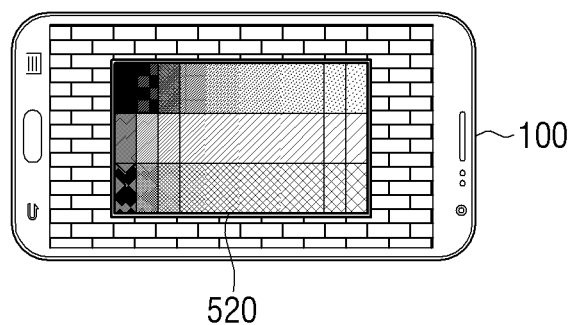

FIG. 5 is a view provided to describe an embodiment of photographing a reference image according to an embodiment.

The processor 140 may transmit the reference image to the display device 200. Accordingly, the display device 200 may display the reference image received from the electronic apparatus 100, as illustrated in FIG. 5.

The processor 140 may photograph the display device 200 displaying the reference image and the region including the ambient region (i.e., a background area 530 surrounding the display device 200) of the display device 200, through the camera 120. Hereinafter, the region where the display device 200 exists in the photographed image is referred to as a display region, and the ambient region of the display device 200 is referred to as a background region. An image generated based on the background region is referred to as a background image.

Specifically, while the display device 200 is displaying the reference image, the processor 140, when a user command for controlling a camera is input, may photograph the display device 200 displaying the reference image and a region including the ambient region of the display device 200.

At this time, a reference image 510 displayed on the display device 200, that is, the reference image prestored in the electronic apparatus 100, may be different from a reference image 520 which is photographed by the camera 120 of the electronic apparatus 100.

Specifically, the gradation values of each of the red region, the green region, and the blue region included in the reference image 510 displayed on the display device may be different from the gradation values of each of the red region, green region, and blue region included in the reference image 520 which is photographed by the camera of the electronic apparatus 100.

The reason of the foregoing is that the reference image photographed through the camera 120 of the electronic apparatus 100 is an image of which the gradation value of the restored reference image is changed according to the color temperature and tone, or the like, which are set in the electronic apparatus 100.

For the same reason, the gradation value of the background region photographed through the camera 120 of the electronic apparatus 100 may also be different from the gradation value of the real background. Therefore, when the background image generated based on the background region photographed through the camera of the electronic apparatus 100 is displayed on the display device 200 without color correction, the gradation value of the real background is different from the gradation value of the background image and thus the image may look unnatural.

In order to solve the above problem, the processor 140 may compare a plurality of gradation regions included in the photographed reference image and a plurality of gradation regions included in the pre-stored reference image, and obtain correction data for correcting the gradation values of each of the R, G, and B components of the background image.

For this purpose, the processor 140 may identify the reference image displayed on the display device 200 and a background region around the display device 200, from the photographed image.

Figure 6A:
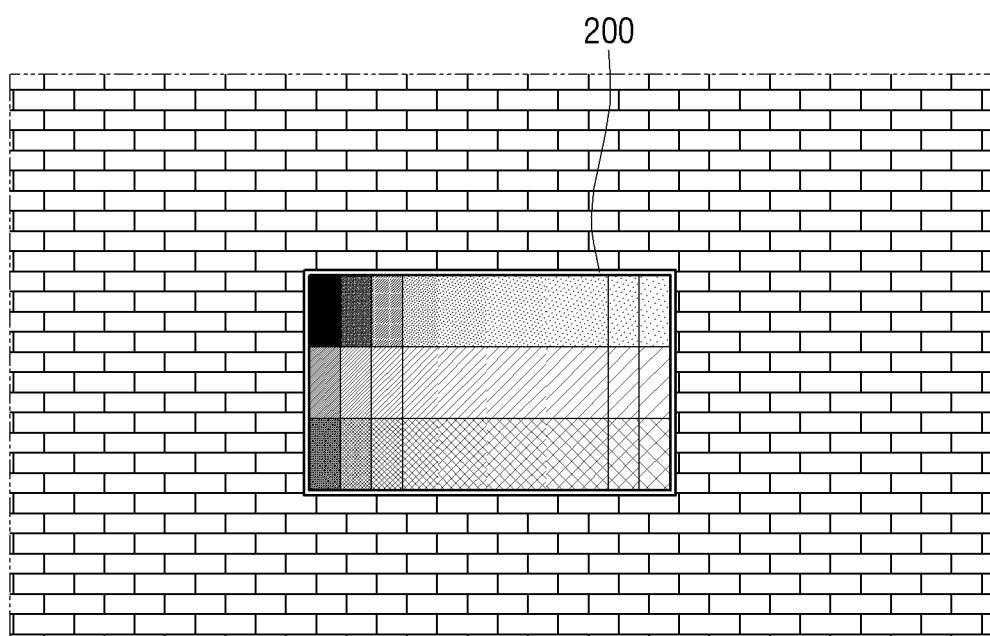
FIG. 6A is a view provided to describe a display device according to an embodiment and an embodiment of identifying a background region.
Figure 6A:
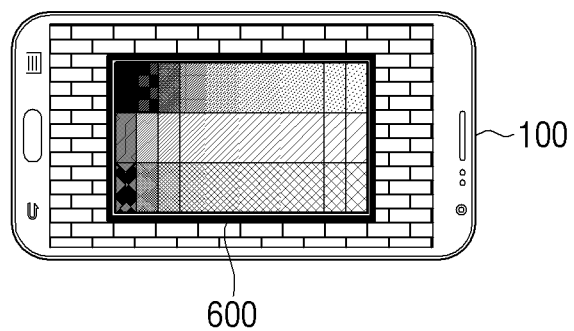
Figure 6B:
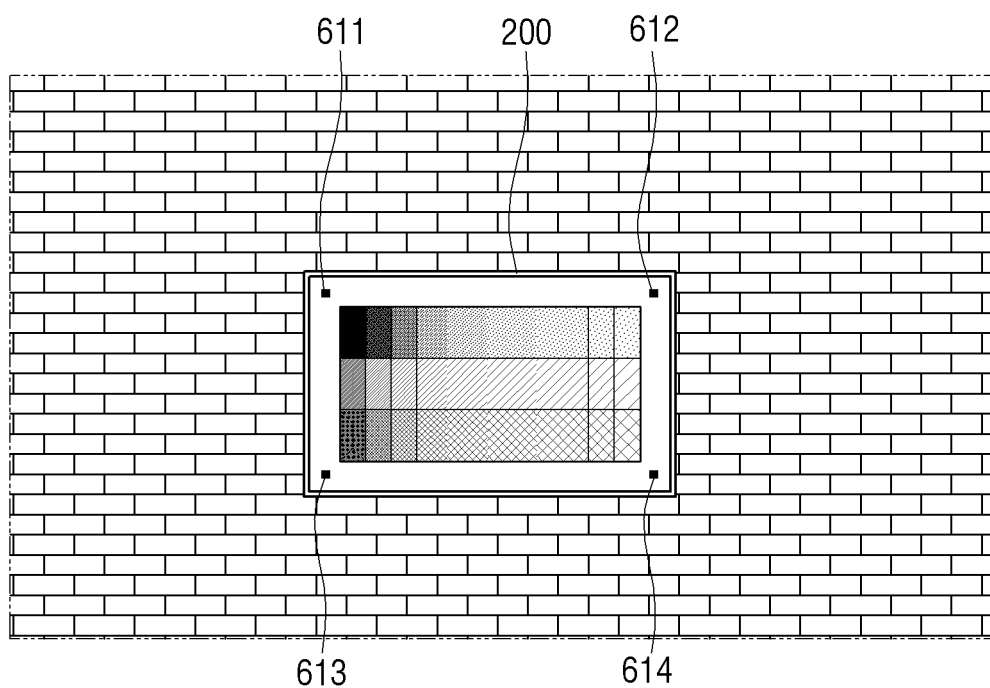
FIG. 6B is a view provided to describe a display device according to an embodiment and an embodiment of identifying a background region.
Figure 6B:
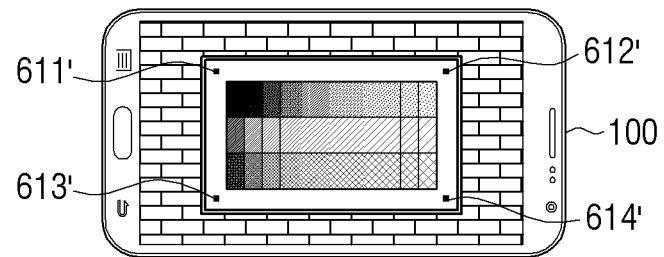

FIGS. 6A and 6B are views provided to describe a display device according to an embodiment and an embodiment of identifying a background region.

The processor 140 may identify the display device 200 and a background region around the display device 200 from the photographed image. Specifically, the processor 140 may identify the reference image displayed on the display device 200 and the background region around the display device 200 from the photographed image.

For this purpose, when the camera application is executed, the processor 140 may display a guide user interface (UI) 600, as illustrated in FIG. 6A. Here, the guide UI 600 may be a UI for guiding a screen of the display device 200 to be included in a specific region.

Then, when the display device 200 and a region including the ambient region of the display device 200 are photographed according to a user command, the processor 140 may analyze a photographed image, identify a region included in the guide UI 600 as a region where the screen of the display device 200 is displayed, and identify another region as a background region.

To be specific, after extracting an outline portion of the display device 200 through the guide UI, the processor 140 may identify the region included in the extracted outline portion as a screen region of the display device 200, and identify a region within a predetermined range, from the identified screen region, as a background region.

As another embodiment, the processor 140 may identify the display device 200 and a background region around the display device 200 using a marker displayed on the display device 200.

For example, referring to FIG. 6B, the display device 200 may display markers 611, 612, 613 and 614 at each corner region of a screen. Here, the marker may be displayed on the screen of the display device 200 by the display device 200 which receives a marker generation command from the electronic apparatus 100.

The processor 140 may photograph an image including the display device 200 in which four markers 611', 612', 613' and 614' are displayed, as illustrated in FIG. 6B, through the camera 120.

The processor 140 may extract the outline portion of the display device 200 using the four markers 611', 612', 613' and 614' included in the photographed image, and then identify a region included in the extracted outline portion as a screen region of the display apparatus 200, and identify a region within a predetermined range from the identified screen region as the background region.

The above embodiment is only one embodiment to identify the display region and the background region, and the identification method is not necessarily limited thereto. For example, the processor 140 may recognize a square-shaped object, by applying an object recognition algorithm to an image photographed through the camera 120, identify the recognized object as the screen region of the display device 200, and identify the another region as a background region.

Figure 7:
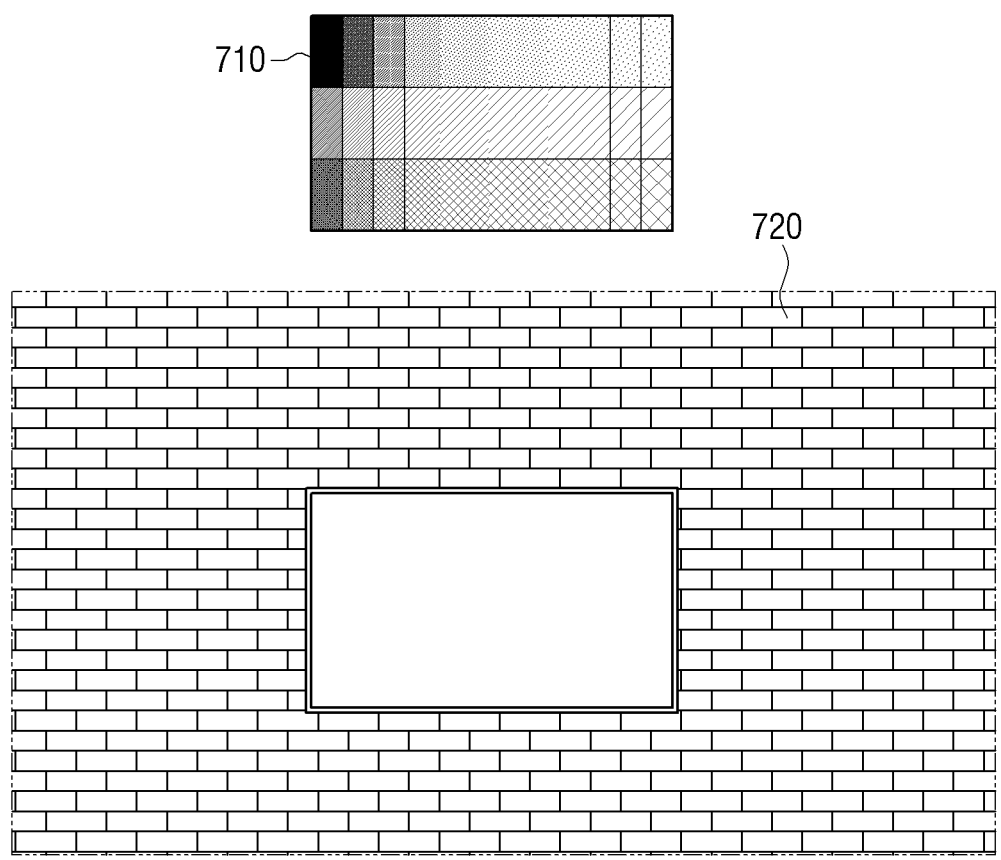
FIG. 7 is a view provided to describe an example of identifying a reference image and an ambient region of a display device from an image of an electronic apparatus according to an embodiment.

Accordingly, as illustrated in FIG. 7, the processor 140 may identify each of a reference image 710 and a background region 720 of the display device 200 included in the photographed image.

Figure 8:
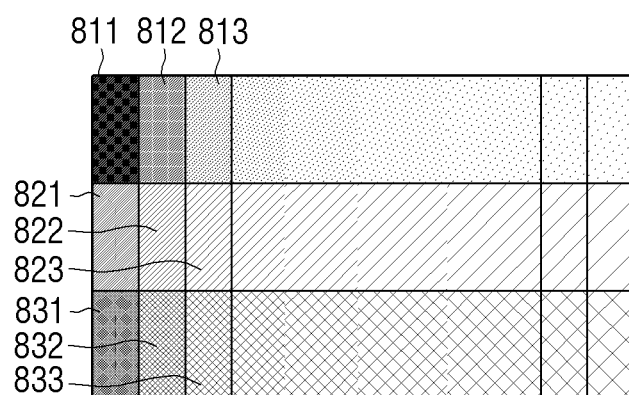
FIG. 8 is a view provided to describe a method for generating correction data according to an embodiment.
Figure 8:
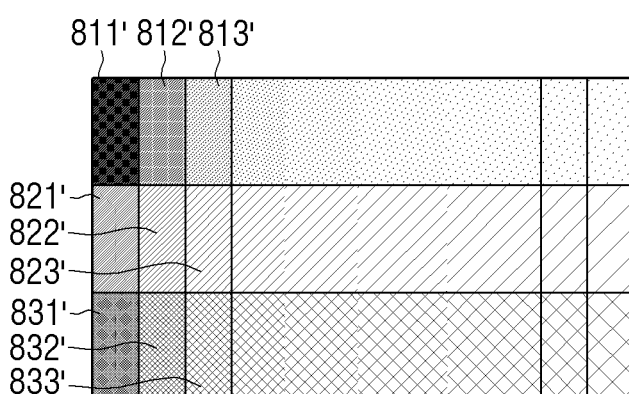

FIG. 8 is a view provided to describe a method for generating correction data according to an embodiment.

The processor 140 may generate correction data based on a reference image 810 included in a photographed image and a prestored reference image 820. Here, the prestored reference image 820 may be the same image as the reference image 510 displayed on the display device 200.

For this purpose, first, the processor 140 may compare a plurality of gradation regions in the reference image 810 included in the photographed image and a plurality of gradation regions included in a prestored reference image 820.

To be specific, the processor 140 may compare gradation values of each of a plurality of gradation regions (811, 812, 813, . . . ) in the red region included in the photographed reference image 810 and the gradation values of each of a plurality of gradation regions (811', 812', 813', . . . ) of the red region included in the reference image 820.

Likewise, the processor 140 may compare gradation values of each of the plurality of gradation regions (821, 822, 823, . . . ) of the green region included in the photographed reference image 810 and gradation values of each of the plurality of gradation regions (821', 822', 823', . . . ) of the green region included in the reference image 820.

As such, the processor 140 may compare gradation values of each of a plurality of gradation regions (831, 832, 833, . . . ) of the blue region included in the photographed reference image 810 and gradation values of each of a plurality of gradation regions (831', 832', 833', . . . ) of the blue region included in the reference image 820.

For example, referring to FIG. 8, the processor 140 may compare the gradation value of the first gradation region 811 of the red region included in the photographed reference image 810 with a gradation value of the first gradation region 811' of the red region included in the prestored reference image 820, compare a gradation value of the second gradation region 812 of the red region included in the photographed reference image 810 with a gradation value of the second gradation region 812' of the red region included in the prestored reference image 820, and compare the gradation value of the third gradation region 813 of the red region included in the photographed reference image 810 with a gradation value of the third gradation region 813' of the red region included in the prestored reference image 820.

Likewise, the processor 140 may compare the gradation value of the first gradation region 821 of the green region included in the photographed reference image 810 with a gradation value of the first gradation region 821' of the green region included in the prestored reference image 820, compare a gradation value of the second gradation region 822 of the green region included in the photographed reference image 810 with a gradation value of the second gradation region 822' of the green region included in the prestored reference image 820, and compare the gradation value of the third gradation region 823 of the green region included in the photographed reference image 810 with a gradation value of the green gradation region 823' of the blue region included in the prestored reference image 820.

Likewise, the processor 140 may compare the gradation value of the first gradation region 831 of the blue region included in the photographed reference image 810 with a gradation value of the first gradation region 831' of the blue region included in the prestored reference image 820, compare a gradation value of the second gradation region 832 of the blue region included in the photographed reference image 810 with a gradation value of the second gradation region 832' of the blue region included in the prestored reference image 820, and compare the gradation value of the third gradation region 833 of the blue region included in the photographed reference image 810 with a gradation value of the third gradation region 833' of the blue region included in the prestored reference image 820.

In the meantime, it has been described that three gradation regions are compared by each color region, but this is for convenient description. That is, the processor 140 may compare all of the plurality of gradation regions of the reference image 810 included in the photographed image with each of a plurality of gradation regions of the prestored reference image 820.

The processor 140 may determine a gradation value of the prestored reference image 820 corresponding to a gradation value of the reference image 810 included in the photographed image, based on a result of comparing each of the plurality of gradation regions.

To be specific, the processor 140 may determine a gradation value of the prestored reference image 820 corresponding to the gradation value of the reference image 810 included in the images photographed by gradation regions, based on a result of comparing each of the plurality of gradation regions.

For example, referring to FIG. 8, when the gradation value of the first gradation region 811 of the red region included in the photographed reference image 810 is 110, and the gradation value of the first gradation region 811' of the red region included in the prestored reference image 820 is 10, the processor 140 may determine that the gradation value of the prestored reference image 820, which corresponds to the gradation value 11 of the photographed reference image 810, is 10. When the gradation value of the second gradation region 812 of the red region included in the photographed reference image 810 is 15, and the gradation value of the second gradation region 812' of the red region included in the prestored reference image 820 is 20, the processor 140 may determine that the gradation value of the prestored reference image 820, which corresponds to the gradation value 15 of the photographed reference image 810, is 20. When the gradation value of the third gradation region 813 of the red region included in the photographed reference image 810 is 20, and the gradation value of the third gradation region 813' of the red region included in the prestored reference image 820 is 30, the processor 140 may determine that the gradation value of the prestored reference image 820, which corresponds to the gradation value 20 of the photographed reference image 810, is 30.

For the green region and the blue region, the technical spirit above may be applicable as it is. For other gradation regions except the above three gradation regions, the above technical spirit may be applied as it is.

Through the above process, the processor 140 may determine a gradation value of the prestored reference image 820 corresponding to the gradation value of the reference image 810 included in the photographed images by the red region, green region, and blue region.

The processor 140 may generate correction data by the red region, green region, and blue region based on the determined gradation value.

To be specific, the processor may generate correction data by applying interpolation to the determined gradation value. Here, the interpolation may be linear interpolation, and may be various interpolation such as second degree polynomial passing through three points or third degree polynomial passing through four points, or the like.

As the embodiment for the red region, if the gradation value of the pre-stored reference image 820 corresponding to the gradation value 11 of the photographed reference image 810 is 10, the gradation value of the prestored reference image 820 corresponding to the gradation value 15 of the photographed reference image 810 is 20, and the gradation value of the prestored reference image 820 which corresponds to the gradation value 20 of the photographed reference image 810 is 30, the processor 140 may generate correction data by applying interpolation to coordinates (11, 10), and coordinates (15, 20), and interpolation to coordinates (15, 20) and (20, 30).

Similarly, the correction data may be generated for the green region and the blue region by applying the interpolation as described above.

Figure 9A:
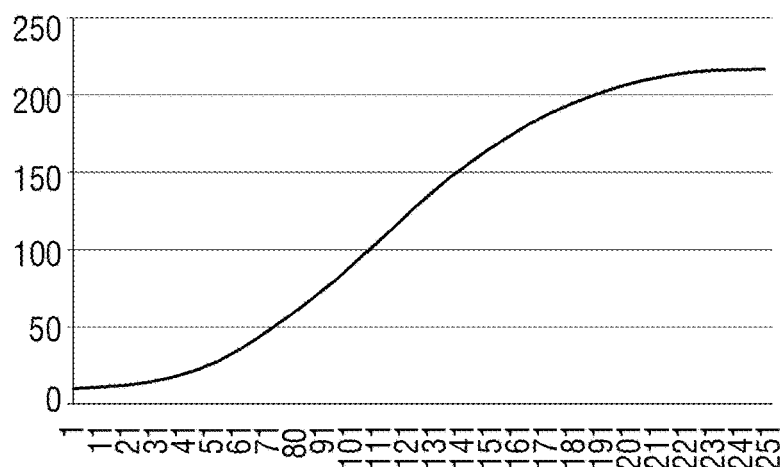
FIGS. 9A, 9B and 9C are views provided to describe correction data according to an embodiment.
Figure 9B:
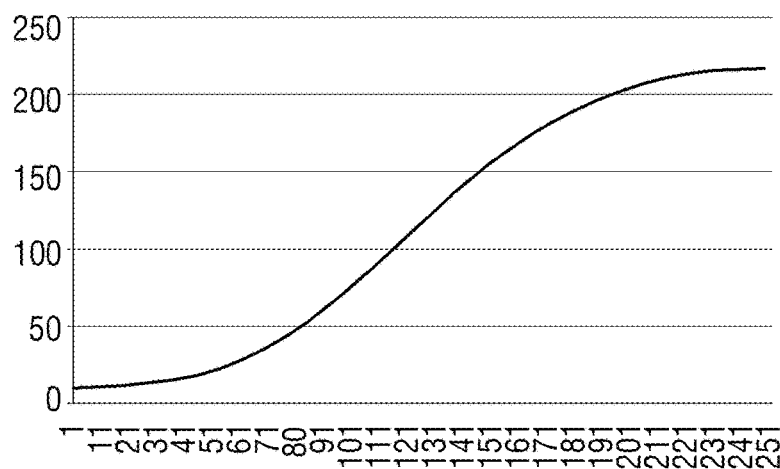
Figure 9C:
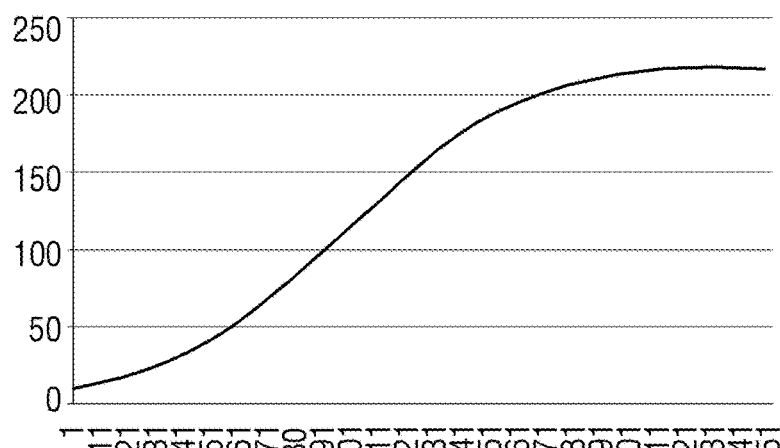

Accordingly, as illustrated in FIGS. 9A, 9B and 9C, the processor 140 may generate correction data (FIG. 9A) for the red region, correction data (FIG. 9B) for the green region, and the correction data (FIG. 9C) for the blue region, respectively. Here, a vertical axis represents a gradation value of the reference image photographed through the camera, and a horizontal axis represents a gradation value of the prestored reference image, that is, a gradation value of the reference image displayed by the display device 200.

Then, the processor 140 may correct the image photographed through the camera 120 using the correction data.

To be specific, the processor 140 may correct the background image using the correction data. Here, the background image may be an image corresponding to the ambient region of the display device 200 as described above. For example, the background image may be an image located in at least one of an upper side, a lower side, a right side, and a left side of the display device 200 within the photographed image.

For this purpose, the processor 140 may determine a gradation value of the background image first. Specifically, the processor 140 may analyze the background image and determine a gradation value of R, G, and B sub-pixels of each of a plurality of pixels included in the background image.

The processor 140 may determine a gradation value corresponding to gradation values of R, G, and B sub-pixels of each of the plurality of pixels included in the background image, using the correction data.

Specifically, the processor 140 may determine a gradation value corresponding to the gradation value of the R sub-pixel using the correction data for the red region, determine a gradation value corresponding to the gradation value of the G sub-pixel using the correction data for the green region, and determine a gradation value corresponding to the gradation value of the B sub-pixel using the correction data for the blue region.

For example, when the gradation value of the R sub-pixel of the first pixel included in the background image is 10, the processor 140 may determine the gradation value 20 corresponding to the gradation value of the R sub-pixel using the correction data for the red region as FIG. 9A, and when the gradation value of the G sub-pixel of the first pixel included in the background image is 100, determine gradation value 120 corresponding to the gradation value of the G sub-pixel using the correction data for the green region as FIG. 9B, and when the gradation value of the B sub-pixel of the first pixel included in the background image is 50, determine the gradation value 60 corresponding to the gradation value of the B sub-pixel using the correction data for the blue region as FIG. 9C.

By the same method, the processor 140 may determine the gradation value corresponding to the gradation value of the R, G, and B sub-pixels included in the first to nth pixels of the background image.

The processor 140 may correct the gradation value of the R, G, and B sub-pixels of the background image to the gradation value corresponding to the gradation value of the R, G, and B sub-pixels based on the correction data.

As the embodiment described above, when the gradation values of each of the R, G, and B components of the first pixel of the background image are 10, 100, and 50, respectively, the processor 140 may correct the gradation values of each of R, G, and B components of the first pixel to 20, 120, and 60, respectively, using the correction data.

Likewise, the processor 140 may correct the gradation value of R, G, and B sub-pixels included in the second to nth pixel using correction data.

Thereafter, the processor 140 may control the communicator 110 so that the corrected background image is outputted to the display device 200.

Specifically, the processor 140 may transmit the reference image to the display device 200 through the communicator 110 so that the corrected background image is outputted to the display device 200.

Figure 10:
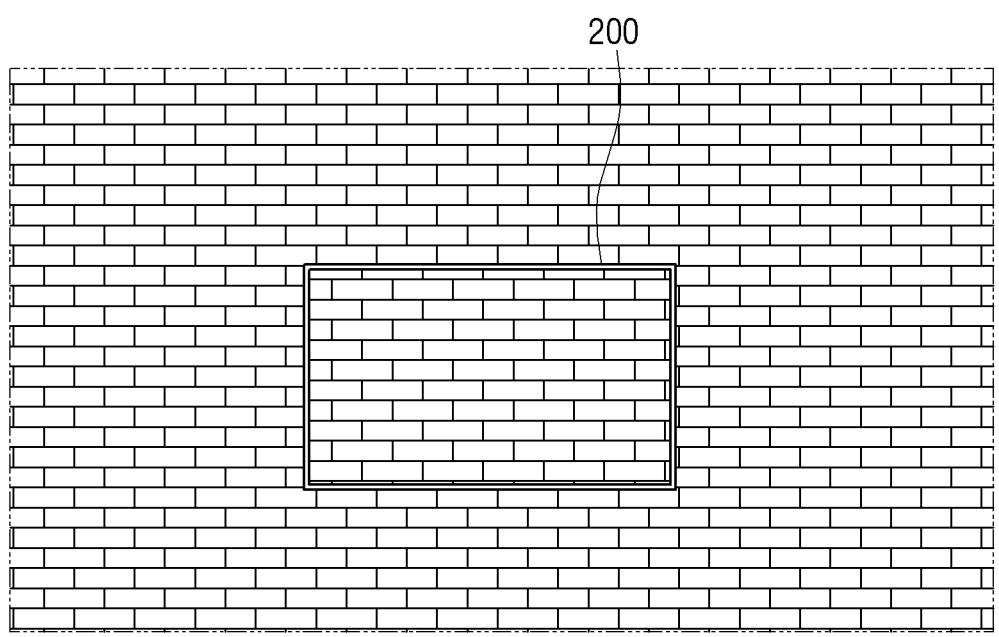
FIG. 10 is a view provided to describe an embodiment of displaying a corrected background image by a display device according to an embodiment.

The processor 140 may control the communicator 110 to transmit the corrected background image to an external device (not shown), and the display device 200 may receive the corrected background image from the external device (not shown) and output the same. Accordingly, the display device 200 may display the corrected background image, as illustrated in FIG. 10.

Accordingly, the electronic apparatus 100 according to an embodiment may maximize for the user the visual effect that the display device 200 looks like a transparent glass window, by minimizing a color difference between the real background and the background image.

In addition, user convenience would be improved in that the corrected background image may be obtained by photographing only once.

Figure 11A:
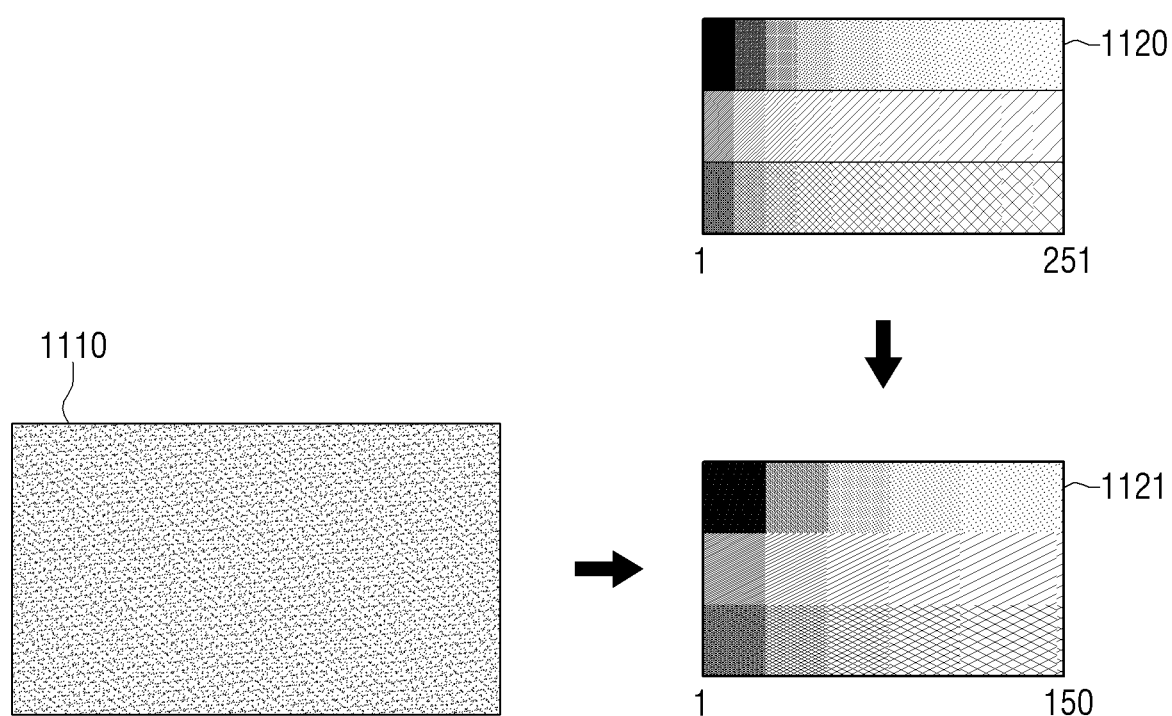
FIG. 11A is a view provided to describe a reference image corrected according to a gradation value of a background according to an embodiment.
Figure 11B:
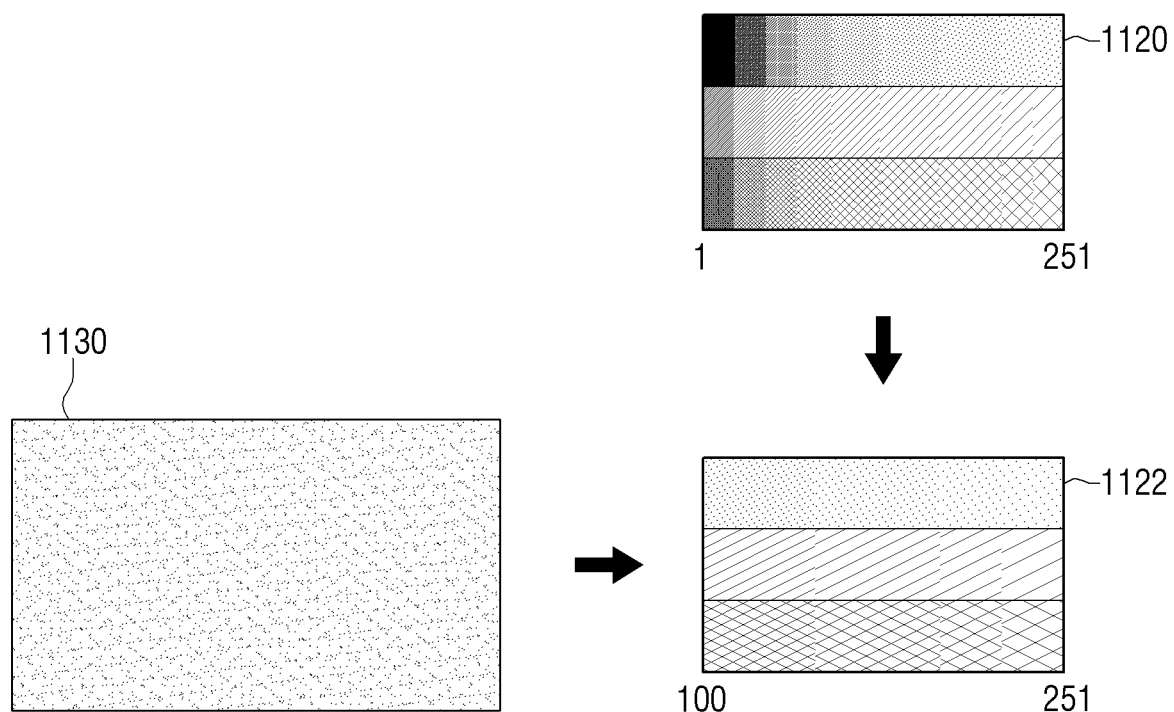
FIG. 11B is a view provided to describe a reference image corrected according to a gradation value of a background according to an embodiment.

FIGS. 11A and 11B are views provided to describe a reference image corrected according to a gradation value of a background according to an embodiment.

The processor 140 may correct the range of the gradation value of the reference image, based on the illumination around the display device 200. For this purpose, the electronic apparatus 140 may further include an illumination sensor (not shown) for sensing the illumination around the electronic apparatus 100.

To be specific, when the illumination around the display device 200 is less than a predetermined threshold illumination, the processor 140 may correct the reference image so that the gradation range less than the predetermined gradation value is included, excluding a gradation value which is greater than or equal to the predetermined gradation value.

For example, referring to FIG. 11A, when the illumination around the display device 200 is less than the predetermined threshold illumination, the processor 140 may correct the gradation value range of the prestored image of which the gradation value is in a range from 1 to 251 to be 1 to 150.

In addition, when the illumination around the display device 200 is greater than or equal to a predetermined threshold illumination, the processor 140 may correct the reference image so that only the gradation range which is greater than or equal to the predetermined gradation value is included, excluding the gradation range which is less than a predetermined gradation value.

For example, referring to FIG. 11B, when the illumination around the display device 200 is greater than or equal to a predetermined threshold illumination, the processor 140 may correct the gradation value range of the prestored reference image of which the range of the gradation value is 1 to 251 to be 100 to 251.

In this case, the processor 140 may correct the gradation unit, while correcting the gradation range. Specifically, the processor 140 may correct the gradation unit of the prestored reference image so as to have the gradation unit which is relatively smaller than the gradation unit of the prestored reference image.

For example, when the gradation unit of the prestored reference image is 10, the processor 140 may correct the gradation unit of the reference image so that the gradation unit is 5.

The processor 140 may generate the correction data based on the reference image of which the gradation range and the gradation unit are corrected. Specifically, the processor 140 may transmit the corrected reference image to the display device 200, photograph the display device 200 displaying the corrected reference image, and then generate the correction data by the aforementioned correction data generation method.

Accordingly, the processor 140 may generate correction data which is relatively precise, when compared to the case where correction data is generated based on the reference image before correction.

In particular, when the gradation unit of the corrected reference image is 1, the processor 140 may have the effect of generating the correction data to correct the background image, without need to apply the aforementioned interpolation method.

Figure 12:
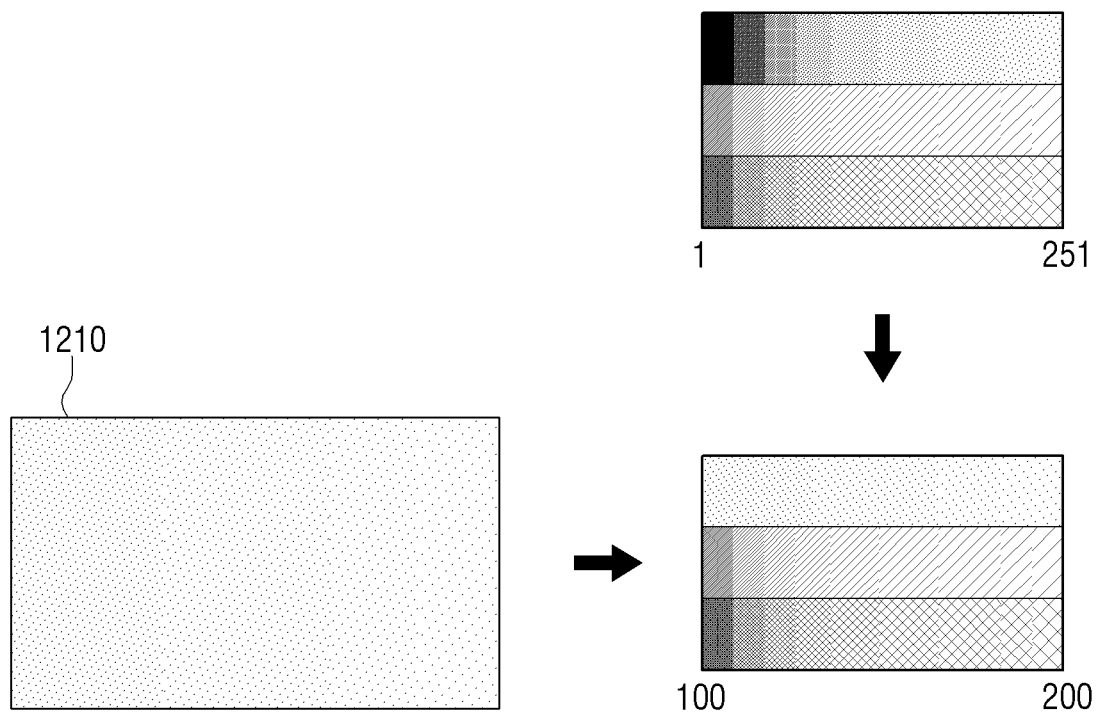
FIG. 12 is a view provided to describe a reference image corrected according to colors of a background according to an embodiment.

FIG. 12 is a view provided to describe a reference image corrected according to colors of a background according to an embodiment.

The processor 140 may correct the gradation value range of the reference image based on color included in the background image of the display device 200.

For this purpose, the processor 140 may photograph an ambient region around the display device 200. For example, the processor 140 may photograph the ambient region of the display device 200 through a pre-view mode and analyze color included in the background image.

When it is determined that the background image includes a specific color for a predetermined ratio or higher, based on the result of analyzing color included in the background image, the processor 140 may correct the gradation range of at least one region from among the red region, green region, and blue region included in the prestored reference image.

To be specific, when it is determined that the background image includes a specific color for a predetermined ratio or higher, the processor 140 may correct the gradation range of at least one region corresponding to the specific color, from among the red region, green region, and blue region included in the prestored reference image.

For example, referring to FIG. 12, if it is determined that the background image includes red color for a predetermined ratio or higher, the processor 140 may correct the gradation range of the red region from the prestored reference image.

Here, the corrected gradation range may be determined based on the result of analyzing color of the background image. To be specific, the processor 140 may determine an average value of color which is included for a predetermined ratio or more, and correct the gradation range so as to have a predetermined range from the average value.

For example, when the background image includes red color for a predetermined ratio or more, and the average value of R component in the background image is 150, the processor 140 may correct the gradation range of the red region so as to have a predetermined range from gradation value 150. When the predetermined range is set to 50, the processor 140 may correct the gradation of the red region to be in a range from 100 to 200.

The processor 140 may correct the unit of gradation, while correcting the gradation range. To be specific, the processor 140 may correct the unit of gradation of a specific color region so as to have a smaller unit of gradation than a gradation unit of the prestored reference image.

For example, when the gradation unit of the prestored reference image is 10 in the above embodiment, the processor 140 may correct the unit of gradation of the red region of the reference image so that the unit of gradation is 5.

Then, the processor 140 may generate correction data based on the reference image in which the gradation range and the gradation unit are corrected. Specifically, the processor 140 may transmit the corrected reference image to the display device 200, photograph the display device 200 displaying the corrected reference image, and then generate correction data using the correction data generation method described above.

Accordingly, the processor 140 may generate correction data which is relatively precise in the specific color region when compared to a case of generating the correction data based on the reference image before correction.

Accordingly, the processor 140 has an effect of implementing the color of the real background to the background image more precisely.

Figure 13A:
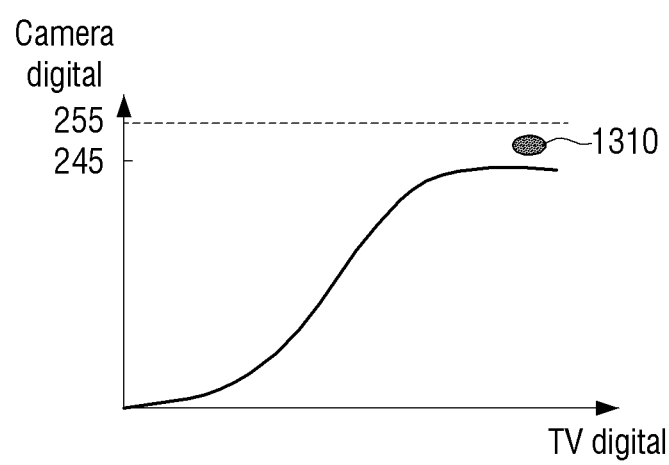
FIGS. 13A and 13B are views provided to describe an embodiment of adjusting luminance of a display device according to an embodiment.
Figure 13B:
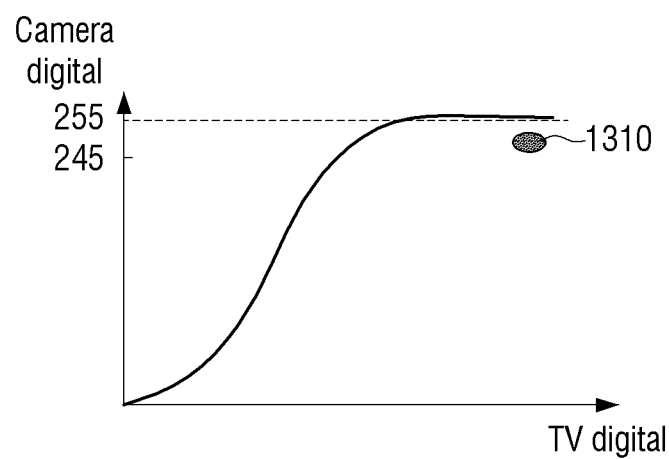

FIGS. 13A and 13B are views provided to describe an embodiment of adjusting luminance of a display device according to an embodiment.

When the luminance of the display device 200 is low, the highest gradation value of the reference image photographed through the camera 120 may also be low. In this case, the processor 140 may have a problem in that the gradation value corresponding to the gradation value of R, G, B sub-pixels of each of the plurality of pixels included in the background image is not determined from the correction data.

For example, when the luminance of the display device 200 is low, the range of the gradation value of the reference image photographed through the camera 120 may be between 1 to 245, and the processor 140 may generate the correction data as FIG. 13A.

Here, if the gradation value of the background image is high, for example, if the gradation value of the background image is 250 with the real background being a bright wall surface, the processor 140 may have a problem that the gradation value corresponding to the gradation value of the background image may not be confirmed from the correction data.

In this case, the processor 140 may transmit, to the display device 200, a signal for adjusting luminance of the display device 200. For example, the processor 140 may transmit a dimming signal for adjusting luminance of the display device 200.

In the embodiment described above, the processor 140 may transmit, to the display device 200, a signal to raise luminance of the display device 200.

The processor 140 may generate the correction data based on the reference image displayed on the display device 200 of which luminance is adjusted.

Accordingly, the processor 140, as illustrated in FIG. 13B, may generate the correction data of which the gradation range of the photographed reference image is between 1 and 255.

Accordingly, the processor 140 may determine the gradation value corresponding to the gradation value of the R, G, and B sub-pixels of each of the plurality of pixels included in the background image, using the correction data.

The technical spirit described above may be applied as it is even in the case where the gradation value corresponding to the gradation values of R, G, and B sub-pixels of each of the plurality of pixels included in the background may not be determined due to high luminance of the display device 200.

Figure 14:
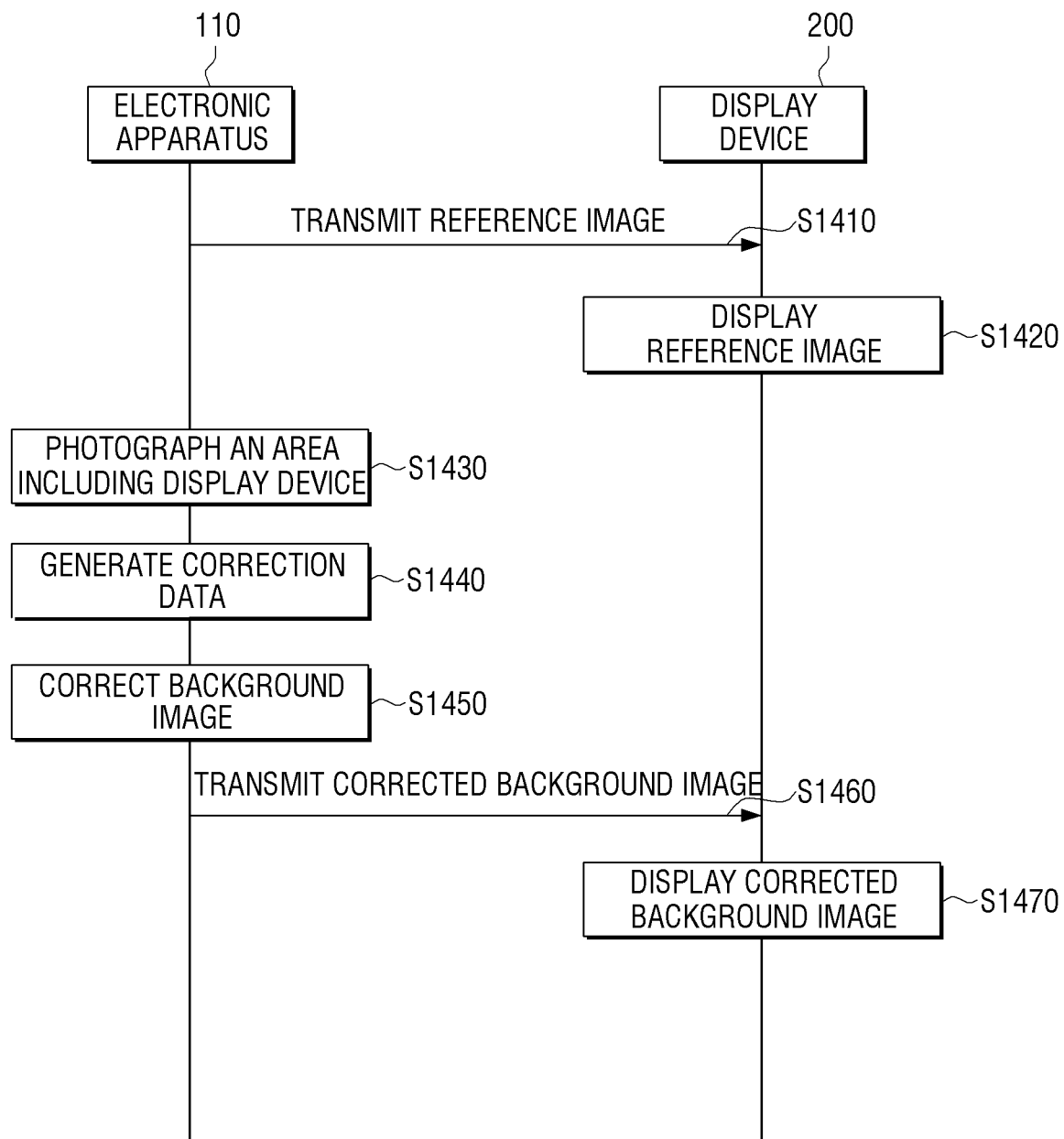
FIG. 14 is a flow chart for providing a background image according to an embodiment.

FIG. 14 is a flow chart for providing a background image according to an embodiment.

The electronic apparatus 100 according to an embodiment may transmit the reference image to the display device 200 in S1410. Here, the reference image is an image prestored in the electronic apparatus 100 and may include a red region, a green region, and a blue region. Each of the red region, the green region, and the blue region may include a plurality of gradation regions having different gradation values, respectively.

Accordingly, the display device 200 may display the reference image in S1420. Here, the gradation value of the displayed reference image may be the same as the gradation value of the reference image transmitted to the display device 200 by the electronic apparatus 100.

The electronic apparatus 100 may photograph a region including the display device 200 which is displaying the reference image in S1430. Here, the photographed image may include the display device 200 and an ambient region of the display device 200.

The electronic apparatus 100 may identify a screen region of the display device 200 and an ambient region of the display device 200 in the photographed image. Here, the screen region of the display device 200 may include the reference image displayed by the display device 200.

The electronic apparatus 100 may compare the reference image included in the photographed image with the pre-stored reference image. Specifically, the electronic apparatus 100 may compare the gradation value of the reference image included in the photographed image with the gradation value of the pre-stored reference image.

The electronic apparatus 100 may generate the correction data for changing the gradation value of the background image, based on the comparison result in S1430. Here, the background image may be an image corresponding to the ambient region of the display device 200, which is included in the photographed image.

Thereafter, the electronic apparatus 100 may correct the background image using the correction data in S1450, and then transmit the corrected background image to the display device in S1460.

Accordingly, the display device 200 may display a background image of which the gradation value is similar to the actual background.

In the above description, the electronic apparatus 100 has been described as correcting the background image based on the correction data, but the correction may be performed by the display device 200. Specifically, the electronic apparatus 100 may transmit the generated correction data and the background image to the display device 200, and the display device 200 may display the image after correcting the background image using the received correction data.

Also, the correction data may be generated by the display device 200. Specifically, the electronic apparatus 100 may transmit the photographed reference image and the pre-stored reference image to the display device 200, and the display device 200 may generate correction data by comparing the photographed reference image and the pre-stored reference image.

Figure 15:
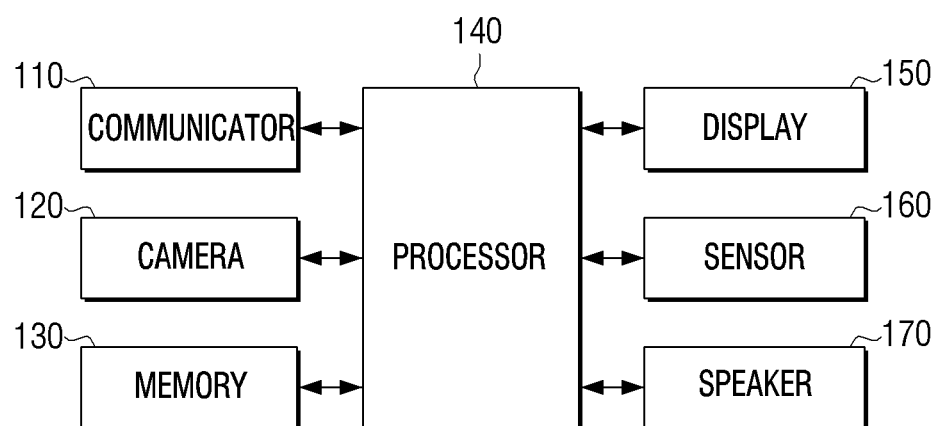
FIG. 15 is a detailed block diagram provided to describe an electronic apparatus according to an embodiment.

FIG. 15 is a detailed block diagram provided to describe an electronic apparatus according to an embodiment.

Referring to FIG. 15, the electronic apparatus 100 may include a communicator 110, a camera 120, a memory 130, a display 150, a sensor 160, a speaker 170, and the processor 140. The descriptions overlapped with the foregoing will be shortened or omitted.

The communicator 110 may transceive various data by communicating with the display device 200. In particular, the communicator 110 may transmit the reference image and the corrected background image by communicating with the display device 200.

The communicator 110 may transceive various data by communicating with an external server (not shown). In particular, the communicator 110 may receive the reference image by performing communication with an external server (not shown).

For this purpose, the communicator 110 may include a Bluetooth chip, a Wi-Fi chip, a wireless communication chip, or the like.

The camera 120 may photograph various subjects. In particular, the camera 120 may photograph a region including the display device 200 and an ambient region of the display device 200.

The camera 120 may be implemented as a dual camera having a plurality of camera modules. This is merely exemplary, and the camera 120 may be implemented as one camera module.

The memory 140 stores various modules for driving the electronic apparatus 100. For example, the memory 140 may store software including a base module, a sensing module, a communication module, a presentation module, a web browser module, and a service module. At this time, the base module is a basic module that processes signals transmitted from the respective hardware included in the electronic apparatus 100 and transfers the signals to an upper layer module. The sensing module is a module for collecting information from various sensors and analyzing and managing collected information, and may include a face recognition module, a voice recognition module, a motion recognition module, a near-field communication (NFC) recognition module, and the like. The presentation module is a module for constructing a display screen, and may include a multimedia module for reproducing and outputting multimedia contents, a UI, and a UI rendering module for performing graphics processing. The communication module is a module for performing communication with the outside. The web browser module refers to a module that accesses a web server by performing web browsing. The service module is a module that includes various applications for providing various services.

The display 150 may display various images. In particular, the display 150 may display an image photographed by the camera 120. The display 150 may display a guide UI for identifying the display device 200 from the photographed image.

The display 150 may be implemented as various types of displays such as a liquid crystal display (LCD), plasma display panel (PDP), or the like. In the display 150, a backlight unit, a driving circuit which may be implemented as a format such as an a-si TFT, low temperature poly silicon (LTPS) TFT, organic TFT (OTFT), or the like, may be included as well. In the meantime, the display 150 may be combined with a touch sensor and implemented as a touch screen.

The sensor 160 may be implemented as various sensors. For example, the sensor 160 may include a touch sensor.

The speaker 170 is a component outputting various audio data on which various processes such as decoding, amplification, noise filtering, and the like, are performed by an audio processor (not illustrated). In addition, the speaker 170 may output various notification sounds or a voice message. According to an embodiment, the speaker 170 may output audio when an image is photographed by the camera 120.

The processor 140 controls overall operations of the electronic apparatus 100. In particular, the processor 140 may control the communicator 110 to transmit the reference image to the display device 200, and control the camera 120 to photograph the display device 200 which displays the reference image. In addition, the processor 140 may generate the correction data by comparing the photographed reference image and the prestored reference image, and control the communicator 110 to transmit the corrected background image to the display device 200 using the correction data.

In the meantime, generating the correction data and/or correcting the background image may be performed by a server (not shown) communicating with the electronic apparatus 100.

According to an embodiment, the electronic apparatus 100 may transmit the correction data and the background image to a server (not shown). In this case, the server (not shown) may correct the background image based on the received correction data and transmit, to the display device 200, the corrected background image. Alternatively, the server (not shown) may transmit, to the electronic apparatus 100, the corrected background image, and the electronic apparatus 100 may transmit, to the display device 200, the corrected background image which is received.

According to one embodiment, the electronic apparatus 100 may transmit an image of a region including the display device 200 to a server (not shown). In this case, the server (not shown) may identify the screen region and background region of the display device 200 in the received image, and compare the reference image included in the photographed image and the reference image received from the electronic apparatus 100. Then, the server (not shown) may generate correction data based on the comparison result. The server (not shown) may correct the background image based on the correction data and transmit the corrected background image to the display device 200. Alternatively, the server (not shown) may transmit the corrected background image to the electronic apparatus 100, and the electronic apparatus 100 may transmit the received corrected background image to the display device 200.

Though not illustrated in FIG. 15, the electronic apparatus 100 may further include a microphone.

The processor 140 may control the communicator 110 so that the reference image may be outputted to the display device 200 when the user's voice for displaying the background image is received via the microphone (not shown). When the user's voice for photographing is received through the microphone (not shown), the processor 140 may control the camera 120 to perform the photographing, and obtain the background image from the image acquired through the camera. Thereafter, the processor 140 may correct the background image based on the correction data as described above, and control the communicator 110 so that the corrected background image may be outputted from the display device 200.

Figure 16:
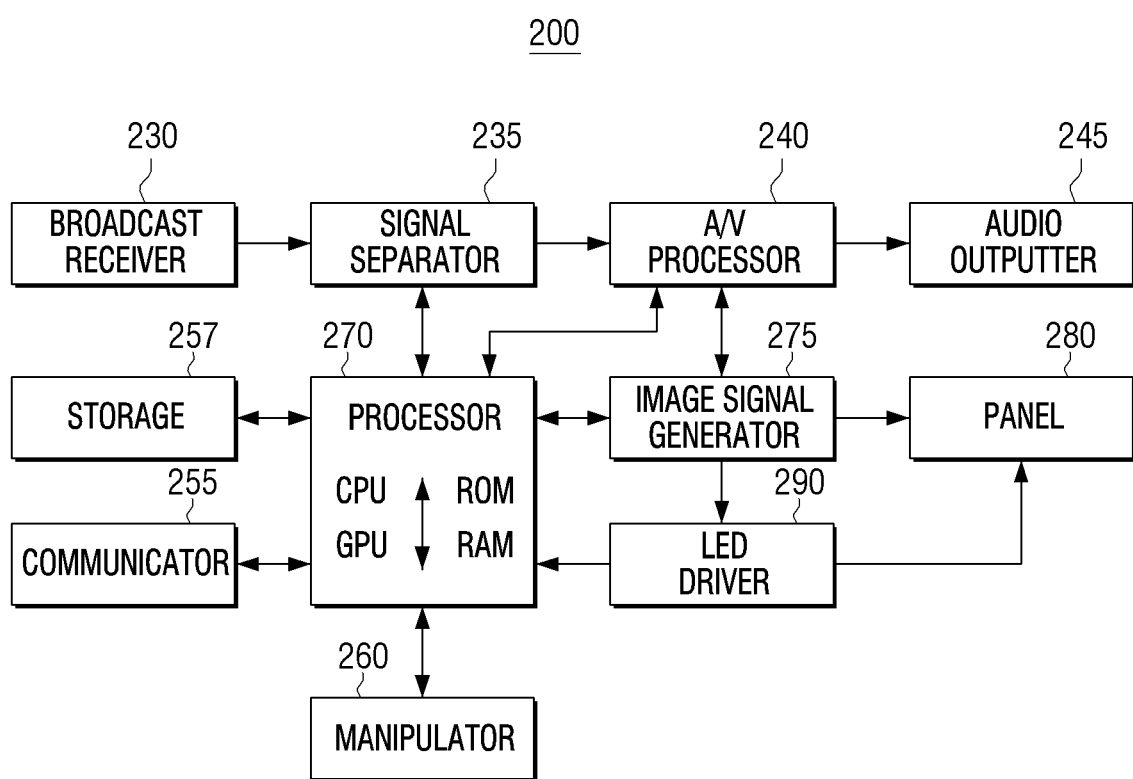
FIG. 16 is a detailed block diagram provided to describe a display device according to an embodiment.

FIG. 16 is a detailed block diagram provided to describe a display device according to an embodiment.

Referring to FIG. 16, the display device 200 according to an embodiment may include a broadcast receiver 230, a signal separator 235, an audio/video (A/V) processor 240, an audio outputter 245, a storage 257, a communicator 255, a manipulator 260, a processor 270, an image signal generator 275, a panel 280, and a light emitting diode (LED) driver 290.

The broadcast receiver 230 may receive broadcast from a broadcasting station or satellite by wire or wirelessly. Here, the broadcast receiver 230 may be implemented as a tuner.

The signal separator 235 separates the broadcasting signal received from the broadcast receiver 230 into an image signal, an audio signal, and an additional information signal. The signal separator 235 transmits the image signal and the audio signal to the A/V processor 240.

The A/V processor 240 may perform signal processing such as video decoding, video scaling, and audio decoding for the image signal and audio signal which are inputted from the broadcast receiver 230 and the storage 257. The A/V processor 240 may transmit the image signal to the image signal generator 220 and transmit an audio signal to the audio outputter 145.

The audio outputter 245 may convert the audio signal received from the A/V processor 240 into sound and output the sound through the speaker (not shown).

The image signal generator 275 generates a graphic user interface (GUI). The image signal generator 275 adds the generated GUI to the image received from the A/V processor 240. The image signal generator 275 transmits the image signal corresponding to the image to which the GUI is added to the panel 280. Accordingly, the panel 280 may display various kinds of information provided by the display device 200 and an image transmitted from the image signal generator 275.

The image signal generator 275 may extract luminance information corresponding to the image signal and generate a dimming signal corresponding to the extracted luminance information. The image signal generator 275 may provide the generated dimming signal to the panel 280. This dimming signal may be a pulse width modulation (PWM) signal. In the embodiment, it has been described that the image signal generator 275 generates a dimming signal and provides the dimming signal to the panel 280. However, the panel 280 may generate the dimming signal by itself.

The panel 280 displays an image. The panel 280 may be implemented as various types of displays such as a liquid crystal display (LCD), organic light emitting diodes (OLED) display, or the like. In the panel 280, a backlight unit, a driving circuit which may be implemented as a format such as an a-si TFT, low temperature poly silicon (LTPS) TFT, organic TFT (OTFT), or the like, may be included as well.

In the meantime, the panel 280 may be combined with a touch sensor and implemented as a touch screen.

The storage 257 may store image contents. To be specific, the storage 257 may receive, from the A/V processor 240, image contents in which image and audio are compressed and store the same. The storage 257 may be implemented as a hard disk, a non-volatile memory, volatile memory, or the like.

The manipulator 260 may be implemented as a touch screen, a touch pad, a key button, a key pad, or the like. According to an embodiment, the manipulator 260 is an input interface.

The communicator 255 is a configuration to perform communication with various types of external devices according to various types of communication methods. The communicator 255 may include a Wi-Fi chip and a Bluetooth chip. The processor 270 may communicate with various types of external devices using the communicator 255. In particular, the communicator 255 may communicate with the electronic apparatus 100.

In the meantime, the display device 200 may further include a USB port to which a USB connector may be connected, various external input ports for connecting to various external terminals, such as a headset, mouse, LAN, a digital multimedia broadcasting (DMB) chip for receiving and processing the DMB signal, or the like.

The display device 200 may further include a power supplier (not show) and a sensing unit (not shown) in addition to the configurations of FIG. 16. The power supplier supplies power to each configuration in the display device 200. The sensing unit may include various sensing devices such as a camera, a motion detector, or the like.

The display device 200 may further include an interface (not shown) which may be connected to an image providing device such as a set-top box. Here, the interface may be a high-definition multimedia interface (HDMI) port, a component input port, a red-green-blue (RGB) port, a digital visual interface (DVI) port, a display port (DP), a USB port, or the like. Accordingly, the display device 200 may receive, from the image providing device such as a set-top box, a broadcast signal, an image signal for the contents, an audio signal or the like, through the interface (not shown).

The display device 200 may process an image signal received from the image providing device through the interface and display an image through the panel 280, convert the received audio signal to sound, and output the sound through a speaker (not shown).

The processor 270 controls overall operations of the display device 200. To be specific, the processor 270 may control the image signal generator 275 and the panel 280 so as to display an image according to a control command which is inputted through the manipulator 260. In particular, the processor 270 may include a central processing unit (CPU), a graphics processing unit (GPU), read-only memory (ROM), and random-access memory (RAM), as illustrated in FIG. 16.

In particular, the processor 270 may control the panel 280 to display the reference image received from the electronic apparatus 100. In addition, the processor 270 may control the panel 280 to display the corrected background image received from the electronic apparatus 100.

In the meantime, it has been described that the background image is corrected by the electronic apparatus 100, but correcting the background image may be performed by the display device 200.

According to an embodiment, when the correction data and the background image are received from the electronic apparatus 100, the processor 270 may correct the background image based on the received correction data, and control the panel 280 to display the corrected background image.

In accordance with one embodiment, when an image of the region including the display device 200 is received from the electronic apparatus 100, the processor 270 may identify the screen region of the display device 200 and the background region from the photographed image, and compare the reference image included in the photographed image and the reference image received from the electronic apparatus 100. The processor 270 may generate correction data based on the comparison result. Then, the processor 270 may correct the background image based on the correction data and control the panel 280 to display the corrected background image.

Herein, it has been described that the reference image is received from the electronic apparatus 100, but the reference image may be an image prestored in the storage 257.

In this case, the processor 240 may display the reference image when a user command for displaying the reference image is received from the electronic apparatus 100. Then, when an image of the region including the display device 200 is received from the electronic apparatus 100, the processor 270 may identify the screen region and the background region of the display device 200 in the photographed image, and compare the reference image included in the photographed image and the reference image pre-stored in the storage 257. The processor 270 may generate correction data based on the comparison result. The processor 270 may correct the background image based on the correction data, and control the panel 280 to display the corrected background image.

FIG. 17 is a flowchart to describe a control method of an electronic apparatus according to an embodiment.

The electronic apparatus 100 may include the red region, green region, and blue region, and may transmit, to the display device, a reference image including a plurality of gradation regions in which each region has different gradation values in S1710.

The electronic apparatus 100 may photograph the display device displaying the reference image and a background of the display device through the camera in S1720.

The electronic apparatus 100 may obtain the correction data for correcting gradation values of each of R, G, and B, based on the plurality of gradation regions included in the photographed image and the plurality of gradation regions included in the stored reference image in S1730.

Thereafter, the electronic apparatus 100 may correct the background image corresponding to the background of the image photographed based on the obtained correction data in S1740.

The electronic apparatus 100 may transmit the corrected background image to the display device in S1750.

Accordingly, the display device 200 may display the corrected background image and provide a visual effect like a glass window.

According to another embodiment, the electronic apparatus may include a memory storing a first image comprising a plurality of gradation regions having different gradation values and a processor configured to: acquire a second image captured by a camera comprising a first portion and a second portion, the first portion corresponding to a display screen that outputs the first image and the second portion corresponding to an area surrounding the display screen; and obtain adjustment data for adjusting a gradation value in the first portion of the second image based on a difference between a plurality of gradation regions included in the first portion of the second image and the plurality of gradation regions included in the first image stored in the memory, and control the display screen to output a third image corresponding to the second portion of the second image based on the adjustment data.

According to an embodiment, the electronic apparatus may include a camera configured to capture the second image. According to another embodiment, the camera might be external to the electronic apparatus.

According to another embodiment, the electronic apparatus may include a display screen that displays the third image. According to another embodiment, the display panel may be external to the electronic apparatus.

According to an embodiment, the processor may be further configured to generate the third image by including at least a part of the second portion of the second image into the third image. According to another embodiment, the third image may only include the second portion of the second image into the third image. According to another embodiment, the third image may include the second portion of the second image into the third image along with another image different from the second portion.

According to an embodiment a control method of an electronic apparatus may include receiving, from a storage, a first image comprising a plurality of gradation regions having different gradation values, receiving a second image captured by a camera comprising a first portion and a second portion, the first portion corresponding to a display screen that outputs the first image and the second portion corresponding to an area surrounding the display screen, obtaining adjustment data for adjusting a gradation value in the first portion of the second image based on a difference between a plurality of gradation regions included in the first portion of the second image and the plurality of gradation regions included in the first image stored in the memory, and controlling the display screen to output a third image corresponding to the second portion of the second image based on the adjustment data.

The methods according to various embodiments may be implemented as a format of software or application installable to a related art electronic apparatus.

The methods according to various embodiments may be implemented by software upgrade of a related art electronic apparatus, or hardware upgrade only.

The various embodiments described above may be implemented through an embedded server provided in the electronic apparatus or a server outside the electronic apparatus.

A non-transitory computer readable medium which stores a program for sequentially executing a method for controlling an electronic apparatus according to an embodiment may be provided.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing embodiments and advantages are merely exemplary and are not to be construed as limiting the disclosure. The disclosure can be readily applied to other types of apparatuses. Also, the description of the embodiments of the disclosure is intended to be illustrative, and not to limit the scope of the claims, and many alternatives, modifications, and variations will be apparent to those skilled in the art. While one or more embodiments have been described with reference to the figures, it will be understood by those of ordinary skill in the art that various changes in form and details may be made therein without departing from the spirit and scope as defined by the following claims and their equivalents.

What is claimed is:

1. An electronic apparatus comprising:
a memory storing a reference image comprising a plurality of gradation regions having different gradation values;
a camera configured to photograph a display device that outputs the reference image and an area surrounding the display device; and
a processor configured to:
obtain correction data for correcting a gradation value of the photographed image based on a plurality of gradation regions included in the photographed image and the plurality of gradation regions included in the stored reference image,
generate a background image corresponding to the area surrounding the display device from the photographed image based on the obtained correction data, and
control the display device to output the background image.

2. The electronic apparatus of claim 1,
wherein the processor is further configured to correct a gradation value of R, G, and B sub-pixels of each of at least one pixel included in the background image based on the obtained correction data.

3. The electronic apparatus of claim 2,
wherein the processor is configured to:
obtain the correction data corresponding to the R, G, and B sub-pixels included in each of the at least one pixel of the background image, and
correct the gradation value of the R, G, and B sub-pixels of each of the at least one pixel based on the obtained correction data.

4. The electronic apparatus of claim 1,
wherein the processor is further configured to obtain the correction data for correcting a gradation value of each of R, G, and B components based on gradation levels, by comparing the gradation value of the plurality of gradation regions included in the photographed image and the gradation value of the plurality of gradation regions included in the stored reference image.

5. The electronic apparatus of claim 4,
wherein the reference image is composed of a red region, a green region, and a blue region, and the plurality of gradation regions comprises a plurality of red gradation regions corresponding to the red region having different gradation values, a plurality of green gradation regions having different gradation values corresponding to the green region, and a plurality of blue gradation regions having different gradation values corresponding to the blue region,
wherein the processor is further configured to:
obtain correction data to correct a gradation value of the R component based on the gradation levels, by comparing a gradation value of each gradation region of a red region included in the photographed image and a gradation value of each of the plurality of red gradation regions included in the stored reference image,
obtain correction data to correct a gradation value of the G component based on gradation levels, by comparing a gradation value of each gradation region of a green region included in the photographed image and a gradation value of each of the plurality of green gradation regions included in the stored reference image, and
obtain correction data to correct a gradation value of the B by gradation levels, by comparing a gradation value of each gradation region of a blue region included in the photographed image and a gradation value of each of the plurality of blue gradation regions included in the stored reference image.

6. The electronic apparatus of claim 5,
wherein the processor is further configured to:
correct R sub-pixels of each of at least one pixels included in the background image based on obtained correction data for the R component,
correct G sub-pixels of each of at least one pixels included in the background image based on obtained correction data for the G component, and
correct B sub-pixels of each of at least one pixels included in the background image based on obtained correction data for the B component.

7. The electronic apparatus of claim 5,
wherein gradation values of the R component in the plurality of red gradation regions are different in a stepwise manner, and gradation values of G and B components in the plurality of red gradation regions are equal to each other,
wherein gradation values of the G component in the plurality of green gradation regions are different in a stepwise manner, and gradation values of R and B components in the plurality of green regions are equal to each other, and
wherein gradation values of the B component in the plurality of blue gradation regions are different in a stepwise manner, and gradation values of R and G components in the plurality of blue regions are equal to each other.

8. The electronic apparatus of claim 5,
wherein the processor is further configured to generate the reference image so that a difference of gradation values among a plurality of gradation regions included in a region corresponding to a color which is included in the background image by a predetermined ratio or more, from among a red region, a green region, and a blue region, is smaller than a difference of gradation values among a plurality of gradation regions included in another region, based on a color included in the background image.

9. The electronic apparatus of claim 8,
wherein the processor is configured to:
based on determination that a red color being included in the background image by a predetermined threshold ratio or more, generate the reference image so that a difference of a gradation value of the R component among the plurality of red gradation regions is smaller than a difference of a gradation value of the G component among the plurality of green gradation regions and a difference of a gradation value of the B component among the plurality of blue gradation regions,
based on determination that a green color being included in the background image by a predetermined threshold ratio or more, generate the reference image so that a difference of a gradation value of the G component among the plurality of green gradation regions is smaller than a difference of a gradation value of the R component among the plurality of red gradation regions and a difference of a gradation value of the B component among the plurality of blue gradation regions, and based on a determination that a blue color being included in the background image by a predetermined threshold ratio or more, generate the reference image so that a difference of a gradation value of the B component among the plurality of blue gradation regions is smaller than a difference of a gradation value of the G component among the plurality of green gradation regions and a difference of a gradation value of the R component among the plurality of red gradation regions.

10. The electronic apparatus of claim 1,
wherein the processor is further configured to:
based on a determination that illumination in the area surrounding the display device is less than a first predetermined threshold illumination, generate the reference image by dividing only a gradation range which is less than a first predetermined gradation value into a predetermined gradation unit, and based on a determination that the illumination in the area surrounding the display device is greater than or equal to a second predetermined threshold illumination, generate the reference image by dividing only a gradation range which is greater than or equal to a second predetermined gradation value into the predetermined gradation unit.

11. A control method of an electronic apparatus, the method comprising:
transmitting, to a display device, a prestored reference image comprising a plurality of gradation region having different gradation values;
photographing the display device that outputs the reference image and an area surrounding the display device;
obtaining correction data for correcting a gradation value of the photographed image based on a plurality of gradation regions included in the photographed image and the plurality of gradation regions included in the stored reference image;
generating a background image corresponding to the area surrounding the display device from the photographed image based on the obtained correction data; and
transmitting the background image to output the background image on the display device.

12. The method of claim 11,
wherein the generating the background image comprises correcting a gradation value of R, G, and B sub-pixels of each of at least one pixel included in the background image based on the obtained correction data.

13. The method of claim 12,
wherein the generating the background image comprises obtaining the correction data corresponding to R, G, and B sub-pixels included in each of the at least one pixel of the background image, and correcting the gradation value of the R, G, and B sub-pixels of each of the at least one pixel based on the obtained correction data.

14. The method of claim 11,
wherein the obtaining the correction data comprises obtaining correction data for correcting a gradation value of each of R, G, and B complements based on gradation levels, by comparing the gradation value of the plurality of gradation regions included in the photographed image and the gradation value of the plurality of gradation regions included in the stored reference image.

15. The method of claim 14,
wherein the reference image is composed of a red region, a green region, and a blue region, and the plurality of gradation regions comprises a plurality of red gradation regions corresponding to the red region having different gradation values, a plurality of green gradation regions having different gradation values corresponding to the green region, and a plurality of blue gradation regions having different gradation values corresponding to the blue region, and
wherein the obtaining the correction data comprises:
obtaining correction data to correct a gradation value of the R component based on the gradation levels, by comparing a gradation value of each gradation region of a red region included in the photographed image and a gradation value of each of the plurality of red gradation regions included in the stored reference image,
obtaining correction data to correct a gradation value of the G component based on the gradation levels, by comparing a gradation value of each gradation region of a green region included in the photographed image and a gradation value of each of the plurality of green gradation regions included in the stored reference image, and
obtaining correction data to correct a gradation value of the B component based on the gradation levels, by comparing a gradation value of each gradation region of a blue region included in the photographed image and a gradation value of each of the plurality of blue gradation regions included in the stored reference image.

16. The method of claim 15,
wherein the correcting comprises:
correcting R sub-pixels of each of at least one pixels included in the background image based on obtained correction data for the R component,
correcting G sub-pixels of each of at least one pixels included in the background image based on obtained correction data for the G component, and
correcting B sub-pixels of each of at least one pixels included in the background image based on obtained correction data for the B component.

17. The method of claim 15,
wherein gradation values of the R component in the plurality of red gradation regions are different in a stepwise manner, and gradation values of the G and B components in the plurality of red gradation regions equal to each other,
wherein gradation values of the G component in the plurality of green gradation regions are different in a stepwise manner, and gradation values of the R and B components in the plurality of green gradation regions are equal to each other, and
wherein gradation values of the B component in the plurality of gradation regions are different in a stepwise manner, and gradation values of the R and G components in the plurality of blue gradation regions are equal to each other.

18. The method of claim 15, further comprising:
generating the reference image so that a difference of gradation values among a plurality of gradation regions included in a region corresponding to a color which is included in the background image by a predetermined ratio or more, from among a red region, a green region, and a blue region, is smaller than a difference of gradation values among a plurality of gradation regions included in another region, based on a color included in the background image.

19. The method of claim 18, wherein the generating the reference image comprises:

based on determination that a red color being included in the background image by a predetermined threshold ratio or more, generating the reference image so that a difference of a gradation value of the R component among the plurality of red gradation regions is smaller than a difference of a gradation value of the G component among the plurality of green gradation regions and a difference of a gradation value of the B component among the plurality of blue gradation regions, based on a determination that green color being included in the background image by a predetermined threshold ratio or more, generating the reference image so that a difference of a gradation value of the G component among the plurality of green gradation regions is smaller than a difference of a gradation value of the R component among the plurality of red gradation regions and a difference of a gradation value of the B component among the plurality of blue gradation regions, and based on a determination that blue color being included in the background image by a predetermined threshold ratio or more, generating the reference image so that a difference of a gradation value of the B component among the plurality of blue gradation regions is smaller than a difference of a gradation value of the G component among the plurality of green gradation regions and a difference of a gradation value of the R component among the plurality of red gradation regions.

20. The method of claim 11, further comprising:

based on a determination that illumination in the area surrounding the display device is less than a first predetermined threshold illumination, on a basis of illumination around the display device, generating the reference image by dividing only a gradation range which is less than a first predetermined gradation value, and based on a determination that illumination in the area surrounding the display device being greater than or equal to a second predetermined threshold illumination, generating reference image by dividing only a gradation range which is greater than or equal to a second predetermined gradation value.

* * * * *